(12) United States Patent
Yano et al.

(10) Patent No.: US 7,172,294 B2
(45) Date of Patent: Feb. 6, 2007

(54) MULTI-LAYER FILM CUT FILTER AND PRODUCTION METHOD THEREFOR, UV CUT FILTER, DUSTPROOF GLASS, DISPLAY PANEL AND PROJECTION TYPE DISPLAY UNIT

(75) Inventors: Kunihiko Yano, Nagano (JP); Takahiro Uchidani, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 205 days.

(21) Appl. No.: 10/469,130

(22) PCT Filed: Feb. 20, 2002

(86) PCT No.: PCT/JP02/01457
§ 371 (c)(1),
(2), (4) Date: Jan. 14, 2004

(87) PCT Pub. No.: WO02/069000
PCT Pub. Date: Sep. 6, 2002

(65) Prior Publication Data
US 2004/0114114 A1    Jun. 17, 2004

(30) Foreign Application Priority Data

| | | | |
|---|---|---|---|
| Feb. 27, 2001 | (JP) | ............................ | 2001-052090 |
| Aug. 23, 2001 | (JP) | ............................ | 2001-253484 |
| Sep. 28, 2001 | (JP) | ............................ | 2001-301939 |
| Sep. 28, 2001 | (JP) | ............................ | 2001-301940 |

(51) Int. Cl.
*G03B 21/14* (2006.01)
*G03B 21/26* (2006.01)
*G03B 21/28* (2006.01)
*G02B 5/30* (2006.01)
*G02B 1/10* (2006.01)
*G02B 5/28* (2006.01)
*F02F 1/1335* (2006.01)

(52) U.S. Cl. ........................... 353/84; 353/20; 353/37; 359/487; 359/488; 359/584; 359/586; 359/589; 349/105; 349/106

(58) Field of Classification Search ................ 353/20, 353/34, 84, 37; 359/487, 488, 490, 498, 359/497, 499, 500, 583, 586, 588, 589, 501, 359/584; 349/5, 7–9, 104, 106, 105, 113; 348/105, 113, 744, 786
See application file for complete search history.

(56) References Cited

U.S. PATENT DOCUMENTS 5,743,611 A * 4/1998 Yamaguchi et al. .......... 353/31

(Continued)

FOREIGN PATENT DOCUMENTS

EP        732848 A2       9/1996

(Continued)

*Primary Examiner*—W. B. Perkey
*Assistant Examiner*—Rochelle Blackman
(74) *Attorney, Agent, or Firm*—Sughrue Mion, PLLC

(57) ABSTRACT

A multi-layer film, wherein a ratio H/L or L/H, a balance in optical film thickness between a high-refractive-index layer H and a low-refractive-index layer L, is set within a range of 1.2–2.0 to bias a balance in thickness. A method of producing a dielectric multi-layer film, wherein, when a dielectric multi-layer film is formed, a proportion at which an optical film thickness is formed on a monitor substrate is made larger than usual. A UV reflection film, having a step difference in average transmittance of 70–90% at a specified half-power point and within a wavelength range of 430–450 nm, is provided on a substrate to form a UV cut filter. A UV reflection film at a specified half-power point, a step difference in average transmittance of 70–90% within a wavelength range of 430–450 nm, and a blue conditioning film having a transmittance of at least 90% within a wavelength range of 460–520 nm may be combined. This UV cut filter is applied to the projection type display unit of a ultra-high pressure mercury lamp light source. The UV reflection film may be provided on the dustproof glass of a display unit.

20 Claims, 17 Drawing Sheets

U.S. PATENT DOCUMENTS

| | | | |
|---|---|---|---|
| 5,892,561 A | * | 4/1999 | Suzuki et al. ............... 349/122 |
| 5,993,614 A | * | 11/1999 | Nomura ................. 204/192.12 |
| 6,111,700 A | * | 8/2000 | Kobayashi et al. ......... 359/627 |
| 6,249,378 B1 | * | 6/2001 | Shimamura et al. ........ 359/487 |

FOREIGN PATENT DOCUMENTS

| | | |
|---|---|---|
| JP | 6-109921 A | 4/1944 |
| JP | 1-28678 A | 1/1989 |
| JP | 1-286476 A | 11/1989 |
| JP | 6-180401 A | 6/1994 |
| JP | 7-248534 A | 9/1995 |
| JP | 7-333451 A | 12/1995 |

* cited by examiner

Fig. 12
(a)
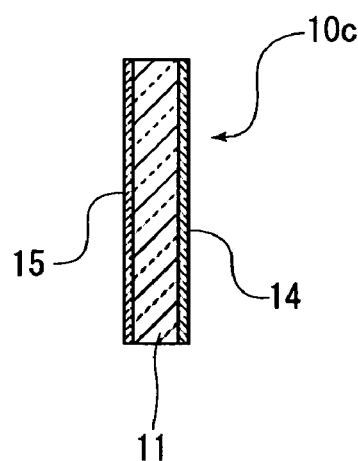
(b)
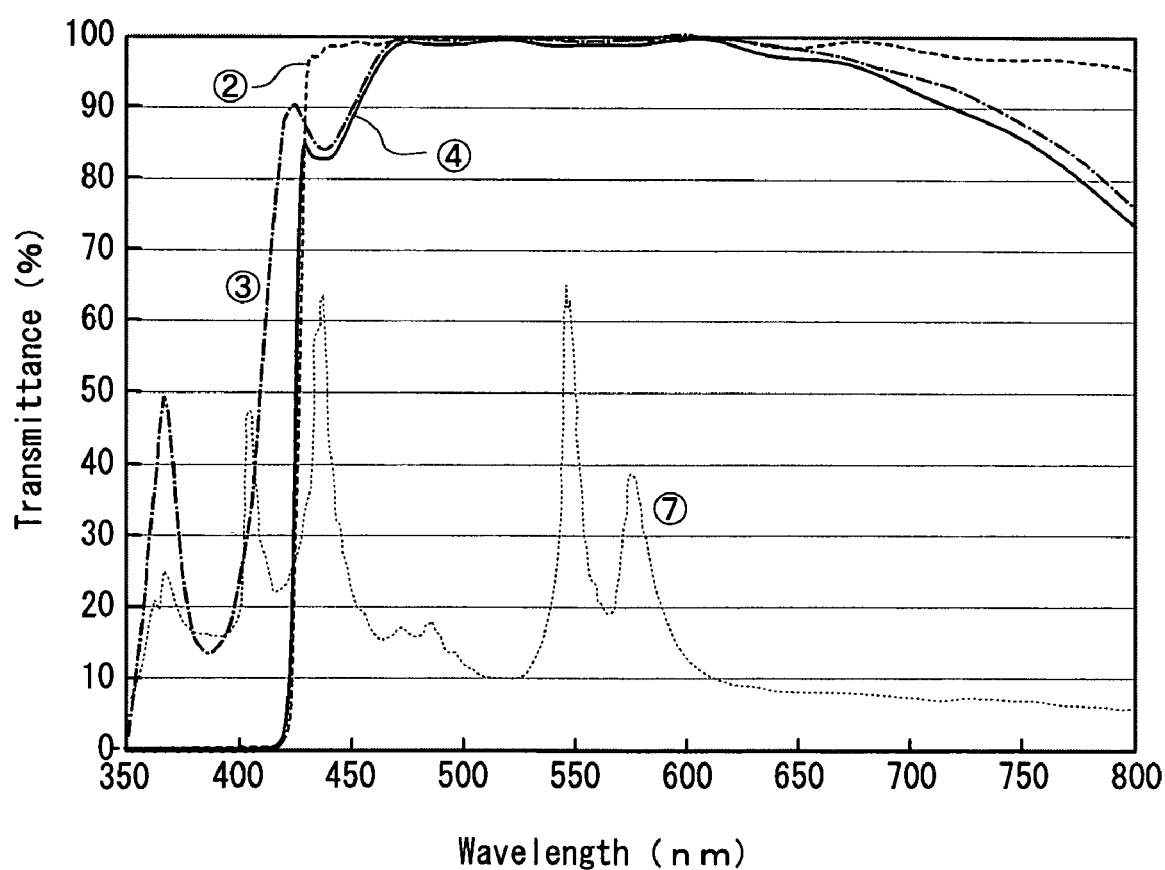

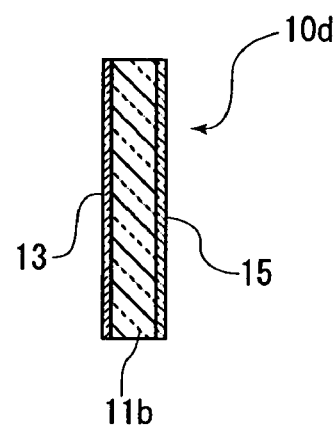
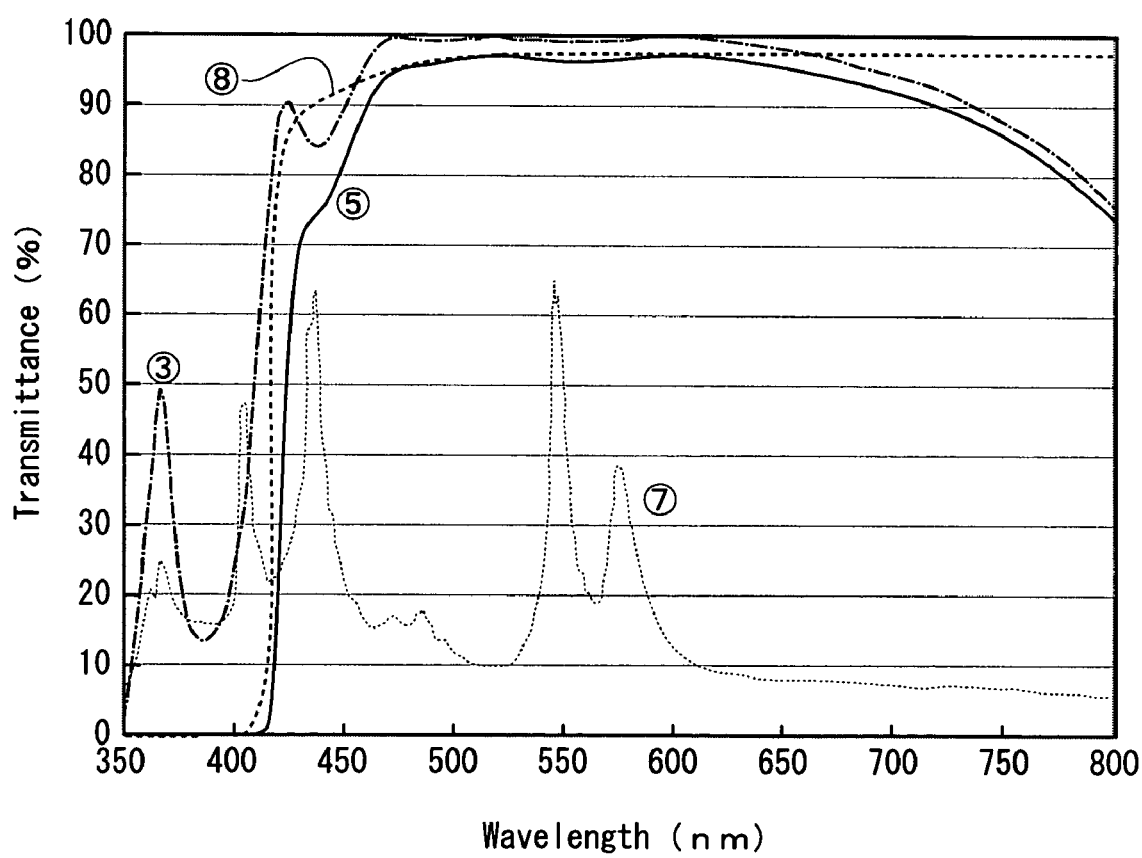
Fig. 13

Fig. 16
(a)
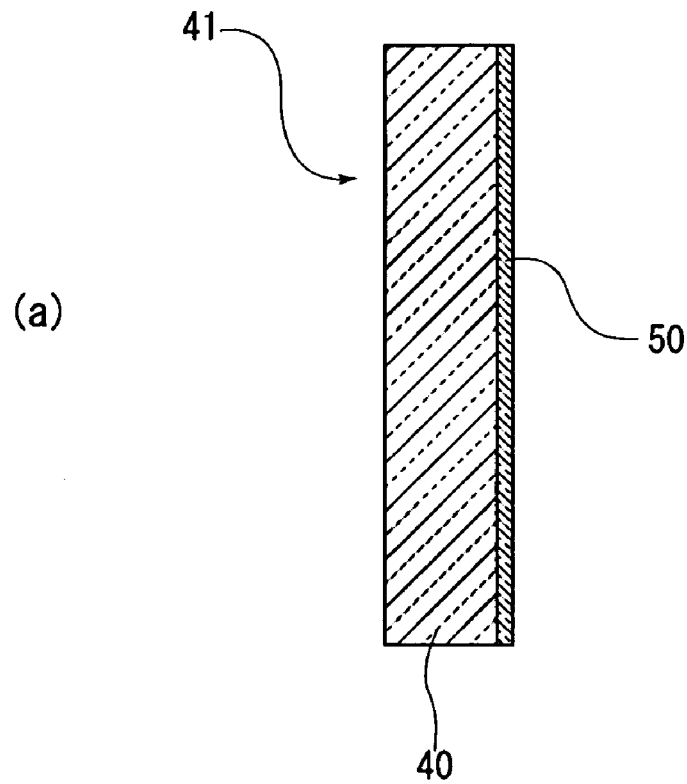
(b)
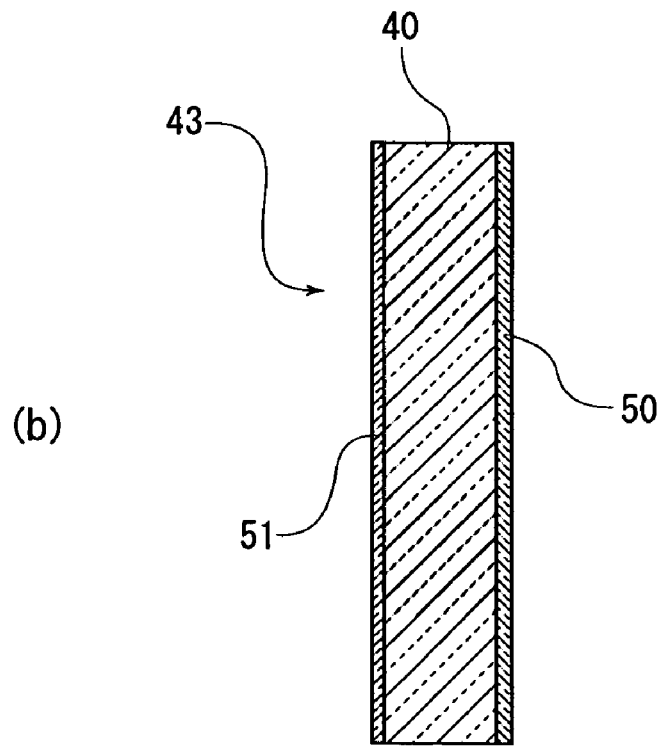

MULTI-LAYER FILM CUT FILTER AND PRODUCTION METHOD THEREFOR, UV CUT FILTER, DUSTPROOF GLASS, DISPLAY PANEL AND PROJECTION TYPE DISPLAY UNIT

TECHNICAL FIELD

The present invention relates to an optical filter technology for cutting light of wavelengths shorter than a specified wavelength and transmitting light of longer wavelength and a production method therefor, a dustproof glass utilizing the optical filter technology, a display panel for image formation which is used in a projection type display unit using the dustproof glass, and a projection type display unit such as a liquid crystal projector using the display panel.

BACKGROUND ART

As to a liquid crystal projector for enlarged projection of images, an increase in luminance and a decrease in size have been progressing year by year, and a high-output ultra-high pressure mercury lamp generating strong UV rays has come to be used as a light source. Since the optical system has been reduced in size, the energy density of the light transmitted through the optical system has been enhanced. Therefore, the problem that the component parts using an organic material such as a liquid crystal panel, a polarizing plate, a phase difference plate, etc. which are used in the optical system inside the liquid crystal projector are deteriorated principally by the UV rays and further by shorter-wavelength rays among visible rays with the result of a reduction in display quality in a short time has become greater. In addition, there is the problem that the liquid crystal display panel absorbs such light to be raised in temperature through heat generation, leading to generation of non-uniformity of the projected image.

In view of this, in the liquid crystal projector, a UV cut filter is disposed in an optical path between the light source and the liquid crystal display panel, for protecting the liquid crystal display panel and other component parts from UV rays and, further, shorter-wavelength rays among visible rays which are generated from the light source.

As the UV cut filter, a UV absorptive glass capable of absorbing UV rays or a UV reflective glass comprising a glass substrate provided thereon with a UV reflection film capable of reflecting UV rays is used.

The UV absorptive glass uses a glass substrate for absorbing UV rays, and the wavelengths to be absorbed (cut) and the leading edge characteristic (steepness) of the absorption-to-transmission transition can be controlled by selecting the composition of the material and the thickness of the glass substrate.

However, the UV absorptive glass has the problem that the selection of the wavelengths to be absorbed is limited by the material of the glass substrate and the problem that, since the energy of the absorbed light is converted into heat, the glass substrate would be broken due to the temperature rise when strong light is incident on the UV absorptive glass. This danger has been increasing due to the rise in the energy density of the light in recent years. In addition, even with the material selected and regulated carefully, the transmittance at short wavelengths near the wavelengths to be cut cannot be much enhanced, so that attenuation of the light transmitted through the UV absorptive glass is generated.

On the other hand, in the UV reflective glass, the wavelengths to be cut (reflected) can be arbitrarily selected by conditioning the multi-layer film dielectric constituting the UV reflection film, the leading edge characteristic is steep, and the transmittance at short wavelengths near the wavelengths to be cut can be enhanced.

The UV reflective glass is a kind of multi-layer film cut filter called edge filter. The multi-layer film cut filter has a structure in which a multi-layer film dielectric comprised of an alternate lamination of a high-refractive-index layer and a low-refractive-index layer in predetermined optical film thicknesses (=refractive index n×geometric film thickness d) is formed on a light-transmitting substrate by a vacuum vapor deposition method etc., and can cut the light of wavelengths shorter than a specified wavelength and transmit longer-wavelength light.

However, the UV reflection film composed of the multi-layer film dielectric is known to be extremely difficult to produce. Specifically, in order to achieve a steeper leading edge characteristic, the number of times of film formation in alternately forming the high-refractive-index layers and the low-refractive-index layers must be extremely increased; for example, 30 layers or more must be formed. In addition, the film thickness of each layer is small, particularly in the UV region, and the control of the film thickness of each layer must be conducted with high accuracy for the purpose of setting the leading edge wavelength with high accuracy. It is said that the leading edge wavelength is shifted by 5 nm when the film thickness of each layer is shifted by 1%, for example. According to the film formation technology at present, it is difficult to control the film thickness with high accuracy and thereby to form a UV reflection film having the characteristics as designed.

Accordingly, a multi-layer film cut filter permitting control of film thickness with high accuracy and having characteristics as designed and a production method therefor are requested.

Besides, the functions of the UV cut filter in the liquid crystal projector are to completely shut up UV rays with wavelengths of not more than 400 nm and a part of visible rays near the UV rays, to prevent deterioration of organic component parts due to such rays, and to prolong the life of the product. In addition, it is demanded to cut a part of blue light from an ultra-high pressure mercury lamp which emits light excessively rich in blue, and thereby to improve color balance.

Therefore, the UV cut filter for used in the liquid crystal projector is required to have a transmittance characteristic adjusted to the luminance characteristic of the ultra-high pressure mercury lamp. However, it has been difficult to say that the conventional UV cut filter has a transmittance characteristic adjusted to the luminance characteristic of the ultra-high pressure mercury lamp. FIG. 17 shows the luminance characteristic of the ultra-high pressure mercury lamp.

In the luminance characteristic of the ultra-high pressure mercury lamp indicated by the thin broken line in the figure, blue light is excessively much, and the blue light is still strong even if the light at the peak near 405 nm within the blue wavelength range is substantially cut, so that the light at the peak near 440 nm must further be cut by about 10 to 30%.

In FIG. 17, one example of the spectral transmittance of a UV absorptive glass is indicated by the broken line. In addition, one example of the spectral transmittance of a UV reflection film composed of a dielectric multi-layer film is indicated by the solid line.

The spectral transmittance of the UV absorptive glass is such that the peak near 405 nm can be substantially completely cut, but the spectral transmittance is gradual near 440 nm, and it is difficult to enhance the transmittance at short wavelengths near the wavelengths to be cut. Therefore, there is the problem that attenuation of the light transmitted through the UV absorptive glass is generated.

On the other hand, the spectral transmittance of the UV reflection film has a steep leading edge. In order to condition the transmittance at the peak near 440 nm in the UV reflection film, it is necessary to set the half-power point (the wavelength at which a transmittance equal to one half of the maximum transmittance of the filter is shown) at the leading edge in the vicinity of 430 nm. The spectral transmittance of the UV reflection film shown in FIG. 17 has a half-power point of 433 nm.

However, the UV reflection film is composed of a multi-layer film of a dielectric, and is composed, for example, of a multi-layer film having no less than 33 layers. As has been described above, the control of film thickness of each layer must be conducted with high accuracy in order to set the leading edge wavelength with high accuracy, and it is said that the leading edge wavelength is shifted by 5 nm when the film thickness of each layer is shifted by 1%. Under ordinary production conditions, the accuracy of the half-power point, even with best accuracy, is ±4 nm. Therefore, it is extremely difficult to produce a UV reflection film having a half-power point accurately controlled into the vicinity of 430 nm, so that there is the problem that the transmittance at the peak near 440 nm is largely varied due to a difference in half-power point arising from slight scatter of production conditions.

Accordingly, there is a demand for a UV cut filter capable of securely having a transmittance characteristic adjusted to the luminance characteristic of the ultra-high pressure mercury lamp, and a projection type display unit using the UV cut filter.

Furthermore, the liquid crystal projectors have shown a tendency toward reductions in size and cost in recent years, and it has been keenly demanded to reduce the number of component parts. Therefore, there is a request for a projection type display unit which makes it possible to reduce the UV cut filters as component parts.

The present invention has been made in consideration of the above-mentioned requests and demands. Accordingly, it is a first object of the present invention to provide a multi-layer film cut filter permitting control of film thickness with high accuracy and therefore having characteristics as designed.

A second object of the present invention is to provide a method of producing a multi-layer film cut filter by which film thickness can be easily controlled with high accuracy.

A third object of the present invention is to provide a UV cut filter which securely has a transmittance characteristic adjusted to the luminance characteristic of an ultra-high pressure mercury lamp.

A fourth object of the present invention is to provide a projection type display unit using a UV cut filter having a transmittance characteristic adjusted to the luminance characteristic of an ultra-high pressure mercury lamp.

A fifth object of the present invention is to provide a dustproof glass with which UV cut filers as component parts in a projection type display unit can be reduced.

A sixth object of the present invention is to provide a display panel with which UV cut filters as component parts in a projection type display unit can be reduced.

A seventh object of the present invention is to provide a projection type display unit with which UV cut filters as component parts can be reduced.

SUMMARY OF THE INVENTION

The present inventors have made intensive and extensive investigations in order to attain the first object. As the result of their investigations, the present inventors have found out that, while a repeated alternate layer in which a high-refractive-index layer and a low-refractive-index layer are alternately and repeatedly laminated on each other in respectively equal film thicknesses in a dielectric multi-layer film constituting a UV reflection film functions as a layer necessary for steeply cutting the light of wavelengths shorter than a specified wavelength, it is effective to change, as compared with the prior art, the balance in thickness between the high-refractive-index layer and the low-refractive-index layer in the repeated alternate layer.

Specifically, as contrasted to the prior art in which the ratio H/L in the repeated alternate layer has been 1.0, where H is the optical film thickness of the high-refractive-index layer in the repeated alternate layer and L is the optical film thickness of the low-refractive-index layer, in the present invention the ratio H/L or L/H is set within the range of 1.2 to 2.0.

It has been found out that, when the optical film thickness of one of the high-refractive-index layer and the low-refractive-index layer is biased to be larger and the optical film thickness of the other is biased to be smaller, the measurement of film thickness by an optical film thickness meter using a film thickness monitor substrate in a film formation apparatus can be conducted with high accuracy, whereby the film thickness can be controlled with high accuracy and the leading edge characteristic of the filter obtained becomes better unexpectedly.

For attaining the second object, it has been found out to be effective to interposing a correction plate between a vapor source or sources and a light-transmitting substrate in the film formation apparatus and to use a correction plate larger in width than the conventional one so as to increase the proportion of flying particles which are shielded by the correction plate. Specifically, where the ratio of the film thickness of a layer deposited on the light-transmitting substrate to the film thickness of a layer deposited on the monitor substrate is referred to as tooling coefficient, when the tooling coefficient is set within the range of 0.6 to 0.85, the layer deposited on the monitor substrate becomes thicker than the layer deposited on the light-transmitting substrate, so that the measurement of film thickness by the optical film thickness meter can be conducted with high accuracy, and control of the film thickness can be facilitated.

In addition, for attaining the third object, firstly, it has been found out to be possible to provide the transmittance characteristic of a UV reflection film with a step in average transmittance of 70 to 90% within a wavelength range of 430 to 450 nm. With such a step provided, it suffices to set the half-power point within the range of 415 to 430 nm so that the peak near 405 nm can be cut; therefore, accuracy is not required so much, and such a UV reflection film can be produced easily. Moreover, the transmittance at the peak near 440 nm can be conditioned with good controllability by the step. By this, it is possible to obtain a UV cut filter having a transmittance characteristic adjusted to the luminance characteristic of the ultra-high pressure mercury lamp.

Secondly, it has been found out to be effective to combine a UV reflection film having a half-power point of 415 to 430 nm with a blue conditioning film having an average transmittance of 70 to 90% within a wavelength range of 430 to 450 nm and an average transmittance of at least 90% within a wavelength range of 430 to 520 nm. With this combination, the reflection of UV rays and visible region up to the peak near 405 nm is carried out by the UV reflection film, and the reflection of the peak near 440 nm is carried out by the blue conditioning film. By this, accuracy of the half-power point of the UV reflection film is not required so much, so that the production is facilitated, and the transmittance of the peak near 440 nm can be conditioned with good controllability by the blue conditioning film. As a result, it is possible to obtain a UV cut filter having a transmittance characteristic adjusted to the luminance characteristic of the ultra-high pressure mercury lamp.

Thirdly, it has been found out to be effective to combine a UV absorptive glass having an absorption characteristic with a half-power point of 415 to 430 nm and the above-mentioned blue conditioning film. With this combination, the absorption characteristic of the UV absorptive glass is compensated for by the blue conditioning film, the absorption of UV rays and visible region up to the peak near 405 nm is carried out by the UV absorptive glass, and the transmittance at the peak near 440 nm can be conditioned with good controllability by the blue conditioning film. By this, it is possible to obtain a UV cut filter having a transmittance characteristic adjusted to the luminance characteristic of the ultra-high pressure mercury lamp.

It has been found out that the fourth object can be attained by a projection type display unit in which an ultra-high pressure mercury lamp is used as a light source and in which the above-mentioned UV cut filter having a transmittance characteristic adjusted to the luminance characteristic of the ultra-high pressure mercury lamp is used.

In addition, for attaining the fifth object, it has been found out to be effective to provide a UV reflection film on the front surface of a dustproof glass which is disposed on the incidence side of a display unit constituting a display panel for forming a predetermined image by modulating light emitted from a light source in a projection type display unit, for preventing dust from being deposited on the display unit with the result that the deposited dust is projected.

Specifically, a conventional dustproof glass has a structure in which an antireflection coating for enhancing light transmittance is provided on the front surface of a thick transparent glass substrate. In the case of a UV reflection film, the wavelengths to be cut can be arbitrarily selected by regulating the film thickness, and the transmittance at short wavelengths near the wavelengths to be cut can also be enhanced. Therefore, the UV reflection film has not only the function of cutting UV rays but also the function as an antireflection coating. Moreover, the UV reflection film reflects most of UV rays and absorbs little of UV rays, so that the temperature of the dustproof glass will not be raised; therefore, there arises no inconvenience when a UV cutting function is given to the dustproof glass constituting a display panel. It has thus been found out that the antireflection coating of the dustproof glass can be replaced by the UV reflection film. Then, a projection type display unit using a display panel in which such a dustproof glass is incorporated needs no UV cut filter as a component part, whereby the number of component parts can be reduced.

Accordingly, it has been found out that the sixth object can be attained by incorporating a dustproof glass provided with a UV reflection film into a display panel, and the seventh object can be attained by using such a display panel in a projection type display unit.

BRIEF DESCRIPTION OF DRAWINGS

FIG. 12(a) is a sectional view showing the sectional structure of a UV cut filter according to the present invention in which a UV reflection film and a blue conditioning film are combined, and FIG. 12(b) is a graph showing the spectral transmittance of the UV cut filter.

FIG. 13(a) is a sectional view showing the sectional structure of a UV cut filter according to the present invention in which a UV absorptive glass and a blue conditioning film are combined, and FIG. 13(b) is a graph showing the spectral transmittance of the UV cut filter.

FIGS. 16(a) and 16(b) are sectional views showing embodiments of a dustproof glass according to the present invention.

BEST MODE FOR CARRYING OUT THE INVENTION

Now, embodiments of the present invention will be described below, but the present invention is not limited to the following embodiments.

First, a multi-layer film cut filter for attaining the first object and a method of producing a multi-layer film cut filter for attaining the second object will be described.

The multi-layer film cut filter according to the present invention is one called edge filter, which cuts light of wavelengths shorter than a specified wavelength and transmits light of longer wavelengths or which cuts light of wavelengths longer than a specified wavelength and transmits light of shorter wavelengths. Depending on the function, the edge filter is called UV cut filter, IR cut filter, dichroic filter, cold mirror or the like according to the purpose of use thereof. Such a multi-layer film cut filter is used for cutting or separating unrequited or harmful high-order frequency (short wavelength) light, in various optical measurements or in projection systems, image pickup systems or laser processing systems.

The principal use of the multi-layer film cut filter according to the present invention is the use as a UV cut filter, which is disposed between an optical component part exposed to a source of light containing strong UV rays such as a high-output mercury lamp in a projection type display unit such as a liquid crystal projector, a rear projection unit, television, a projection type display, etc. and the light source, for the purpose of cutting UV rays and a part of short-wavelength visible rays emitted from the light source so as to protect the optical component part. The projection type display unit is a system in which the light from the light source is modulated to form a predetermined image at a display panel, and the light emitted from the display panel is enlargedly projected onto a screen by an enlarged-projection optical system. In the case of performing a color display, the light from the light source is spectrally split into red, green and blue wavelength bands, which are inputted to and modulated at the display panel, and the modulated color components are synthesized so as to display a color image.

Figure 1:
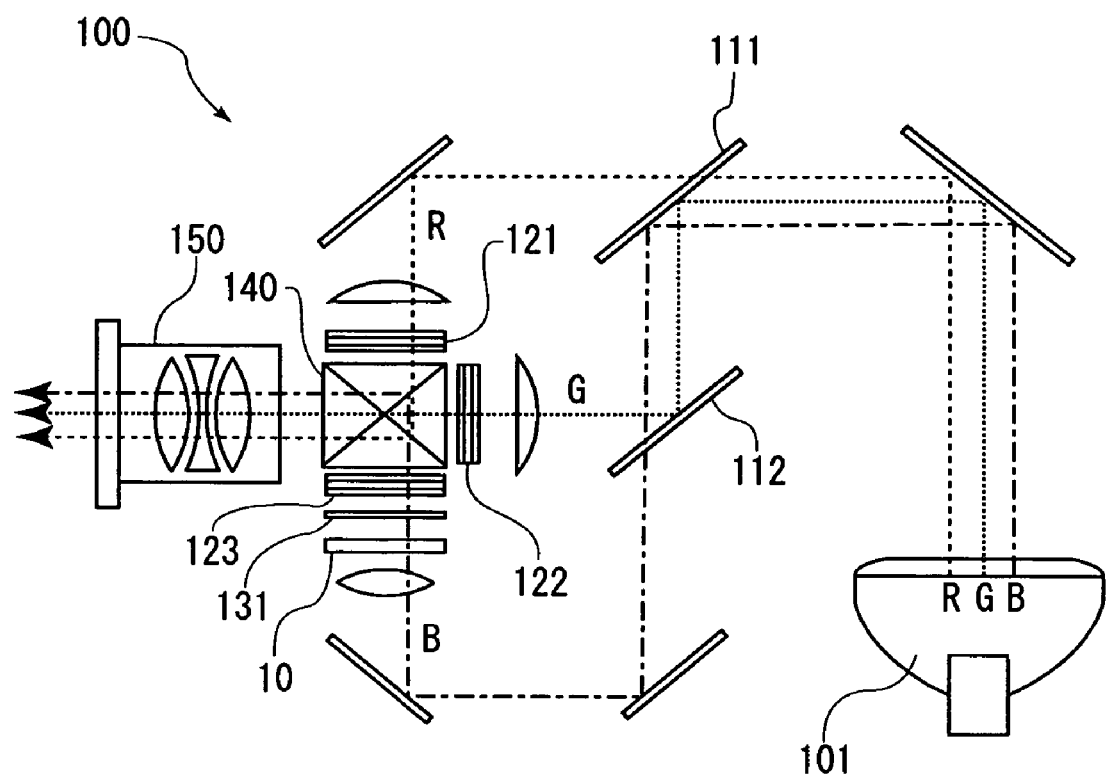
FIG. 1 is a constitutional view showing the general constitution of a liquid crystal projector using a UV cut filter according to the present invention.

FIG. 1 shows the general constitution of a liquid crystal projector. In the liquid crystal projector 100, the light from a light source 101 is spectrally split into three primary colors, i.e., red R, green G, and blue B by a blue-green reflective dichroic mirror 111 and a green reflective dichroic mirror 112, then the red color is passed through a first liquid crystal display panel 121, the green color is passed through a second liquid crystal panel 122, and the blue color is passed through a third liquid crystal display panel 123 via a polarizing plate unit 131. These liquid crystal display panels 121, 122, and 123 are called light bulbs, and the same image is displayed thereon. The light components modulated by passing through the liquid crystal display panels 121, 122, and 123 are synthesized into a color image by a dichroic prism 140, and the color image is projected by a projection lens 150 functioning as an enlarged-projection optical system.

Figure 17:
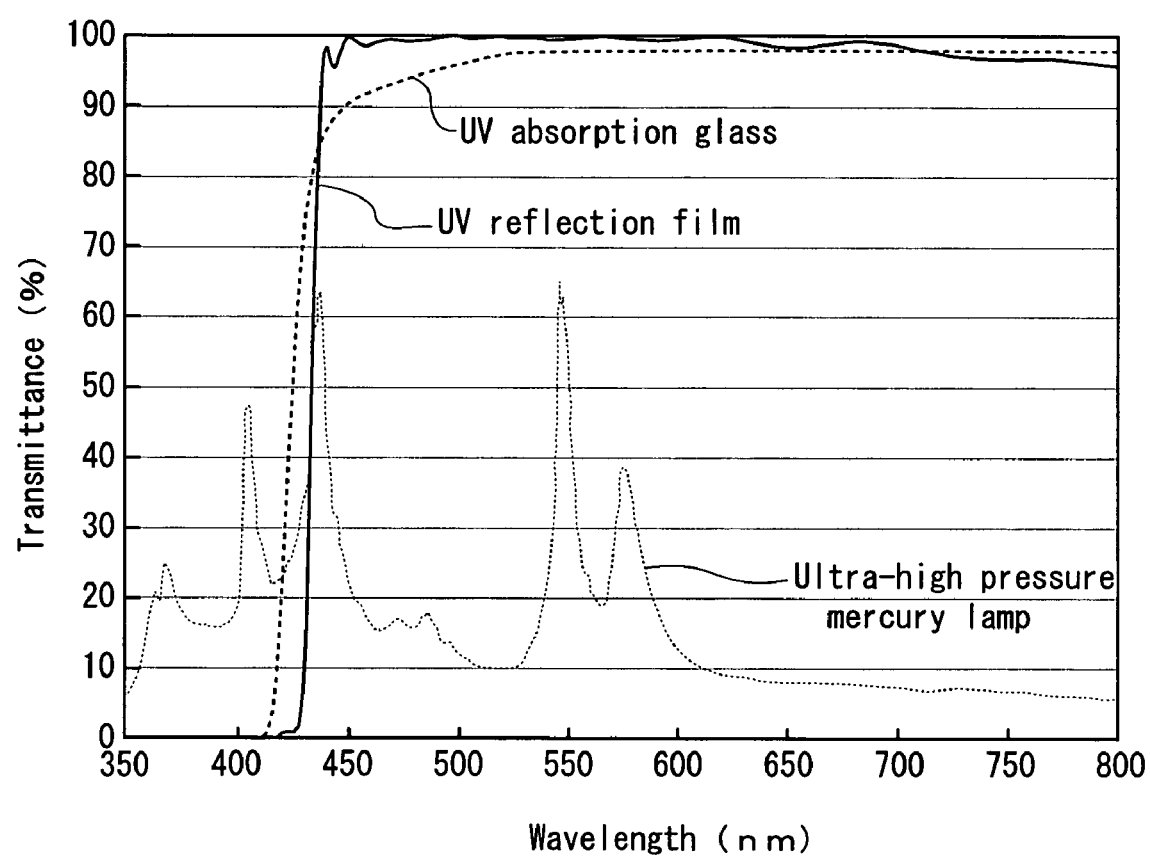
FIG. 17 is a graph showing spectral transmittances of a UV reflection film and a UV absorptive glass.

As the light source 101, in recent years, an ultra-high pressure mercury lamp having an extremely high luminance has been used in many cases. The ultra-high pressure mercury lamp is used also as a UV source, and the light emitted therefrom contains UV components (not more than 400 nm in wavelength) in a very high proportion, as shown in FIG. 17.

While the light components transmitted through the dichroic mirrors 111 and 112 are incident on the first liquid crystal display panel 121 and the second liquid crystal display panel 122, these light components do not contain the UV component since the UV component is contained in the blue color B, and, therefore, these liquid crystal display panels 121 and 122 need no particular measures against UV rays. The UV rays emitted from the light source 101 is primarily incident on the third liquid crystal panel 123.

In an ordinary liquid crystal projector, a UV cut filter 10 is disposed on an optical path on the upstream side of the polarizing plate unit 131 disposed on the upstream side of the third liquid crystal display panel 123 for modulating blue color, in order to protect these component parts from UV rays. The position at which the UV cut filter 10 is disposed is not limited to that shown in FIG. 1, but may be any position on the optical path from the light source 101 to the third liquid crystal display panel 123. Besides, the UV cut filter may not necessarily be provided as an independent component part, and, for example, the function as the UV cut filter may be added to a lens disposed on the optical path.

The multi-layer film cut filter used as the UV cut filter 10 has a structure in which a dielectric multi-layer film composed of an alternate lamination of a high-refractive-index layer and a low-refractive-index layer is formed as a UV reflection film on a light-transmitting substrate.

The light-transmitting substrate may be formed of a material which transmits rays, and, ordinarily, an inorganic glass is used as the material. Examples of the material for this use include soda lime glass, borosilicate glass, lead glass, alkali-free glass, quartz glass, Neoceram, 7971 titanium silicate glass (a product by Corning), sapphire glass, etc.

The shape of the light-transmitting substrate is ordinarily a sheet-like shape, but, for example, an optical lens used in a projection type display unit can be used as the substrate of the UV cut filter according to the present invention.

As the material of the high-refractive-index layers of the dielectric multi-layer film constituting the UV reflection film, there may be used $TiO_2$ (n=2.4), $Ta_2O_5$ (n=2.1), $Nb_2O_5$ (n=2.2) or the like. As the material of the low-refractive-index layers, there may be used $SiO_2$ (n=1.46) or $MgF_2$ (n=1.38). The refractive index varies depending on wavelength, and the just-mentioned values of refractive index n are values at a wavelength of 500 nm.

The basic design of film thickness is generally represented by, for example, the formula $(0.5H, 1L, 0.5H)^s$, as a repeated alternate layer in which a high-refractive-index layer and a low-refractive-index layer are repeatedly and alternately laminated on each other in respectively equal optical film thicknesses. Here, the wavelength near the center of the wavelengths to be cut is made to be a design wavelength λ, the film thickness of the high-refractive-index layer (H) is represented as 1H by taking the optical film thickness nd=¼λ as a unit, and the film thickness of the low-refractive index layer (L) is similarly represented as 1L. S in the formula is called stack number, which is the number of times of repetition, meaning that the constitution parenthesized in the formula is periodically repeated. The number of the layers actually laminated is 2S+1, and, when the value of S is enlarged, the leading edge characteristic (steepness) of the reflection-to-transmission transition can be made steeper. The value of S is selected from the range of about 3 to 20. By the repeated alternate layer, the specified wavelength for the cutting of light is determined.

In order to enhance the transmittance in a transmission band and to change the ruggedness of transmittance called ripples into a flat characteristic, an optimum designing is conducted by varying the film thickness of several layers near the substrate and several layers near the medium, of the repeated alternate layer. Therefore, the design is represented for example by the expression: substrate|0.5LH . . . HL(HL)$^s$HL . . . H, 0.5L. In addition, where $TiO_2$ or the like is used for forming the high-refractive-index layers, it is a common practice to design the repeated alternate layer by adding a layer of $SiO_2$, which is excellent in environmental resistance, as an outermost layer, rather than terminating with the high-refractive-index layer as the outermost layer. As for the layer in contact with the substrate, also, a layer of $SiO_2$, which is chemically stable, may be added as the first layer, since $TiO_2$ might react with the substrate with the result of deterioration of characteristics. Such a designing of the multi-layer film cut filter can be theoretically conducted by use of a commercial software (reference: OPTRONICS, 1999, No. 5, pp. 175–190).

In order to form the high-refractive-index layers and the low-refractive-index layers alternately on the light-transmitting substrate, a physical film formation method is generally used. While an ordinary vacuum vapor deposition method may be used, it is preferable to use ion-assisted vapor deposition, an ion plating method, or a sputtering method, by which it is possible to stably control the refractive indexes of the films and to form films less susceptible to time changes in optical characteristics due to storage, specification and environmental variations. The vacuum vapor deposition method is a method in which a thin film material is evaporated by heating in a high vacuum, and the particles of the evaporated material are deposited on a substrate to form a thin film. The ion plating method is a method in which vapor-deposition particles are ionized, and the ionized particles are accelerated by an electric field, to be deposited on a substrate. Systems of the ion plating method include APS (Advanced Plasma Source), EBEP (Electron Beam Excited Plasma) method, and RF (Radio Frequency) direct substrate opration method (reactive vapor deposition is conducted in the condition where a high-frequency gas plasma is generated in a film formation chamber). The sputtering method is a thin film forming method in which a thin film material is evaporated by sputtering, which is a process for beating out the thin film material by impinging field-accelerated ions against the thin film material, and the particles of the evaporated material are deposited on a substrate. The optical constants such as refractive index of the layer thus formed vary depending on the film formation method, film formation conditions, etc., so that it is necessary to accurately measure the optical constants of the layer to be formed, before production.

Figure 2:
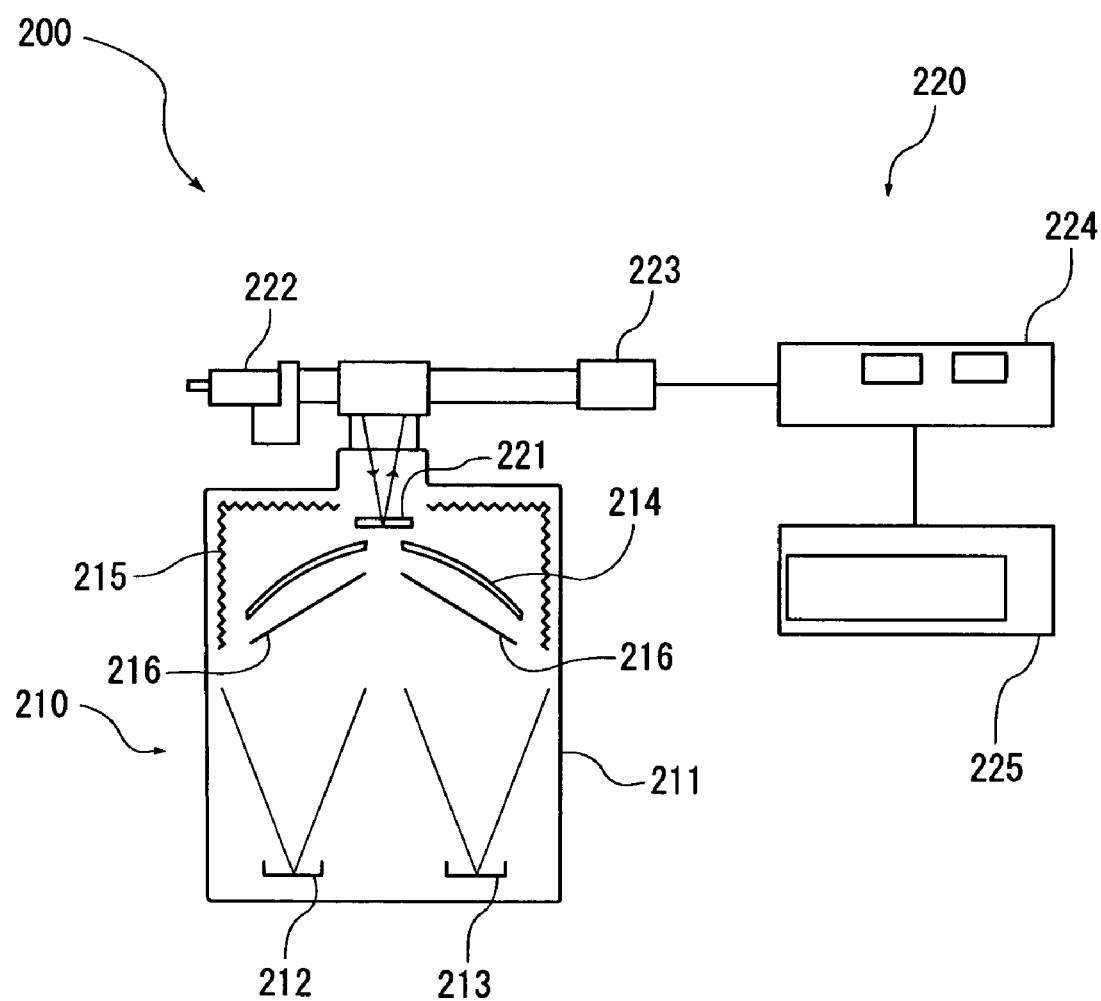
FIG. 2 is a constitutional view showing an outline of a physical film formation apparatus for producing a multi-layer film cut filter according to the present invention.

FIG. 2 shows one example of a physical film formation system using an optical film thickness meter which is widely used for control of film thickness. The physical film formation system 200 comprises a film formation apparatus 210 and the optical film thickness meter 220. Two vapor sources 212 and 213 in which thin film materials, i.e., a high-refractive-index material and a low-refractive-index material are respectively charged in crucibles are disposed at lower portions inside a vacuum chamber 211 constituting the film formation apparatus 210. The vapor sources 212 and 213 can be subjected to heating or sputtering by various methods. A dome-shaped vapor deposition dome 214 for mounting a light-transmitting substrate thereon is rotatably supported at an upper portion inside the vacuum chamber 211. A substrate heater 215 for heating the vapor deposition dome 214 is disposed on the upper side of the vapor deposition dome 214. A hole for monitoring is bored in a central portion of the vapor deposition dome 214, and a monitor substrate 221 for monitoring film thickness, which constitutes the optical film thickness meter 220, is disposed at the hole. The monitor substrate 221 is composed of a monitor glass. Light emitted from a light projector 222 is incident on a film formation surface of the monitor substrate 221, the light reflected by the film formation surface is received by a light receiving unit 223 and is converted into an electric signal, which is transmitted to a measuring unit 224, which measures the quantity of reflected light, and the reflected light quantity is outputted to a recorder 225. Correction plates 216 for correcting film thickness distribution are fixedly disposed between the vapor sources 212, 213 and the vapor deposition dome 214.

Figure 3:
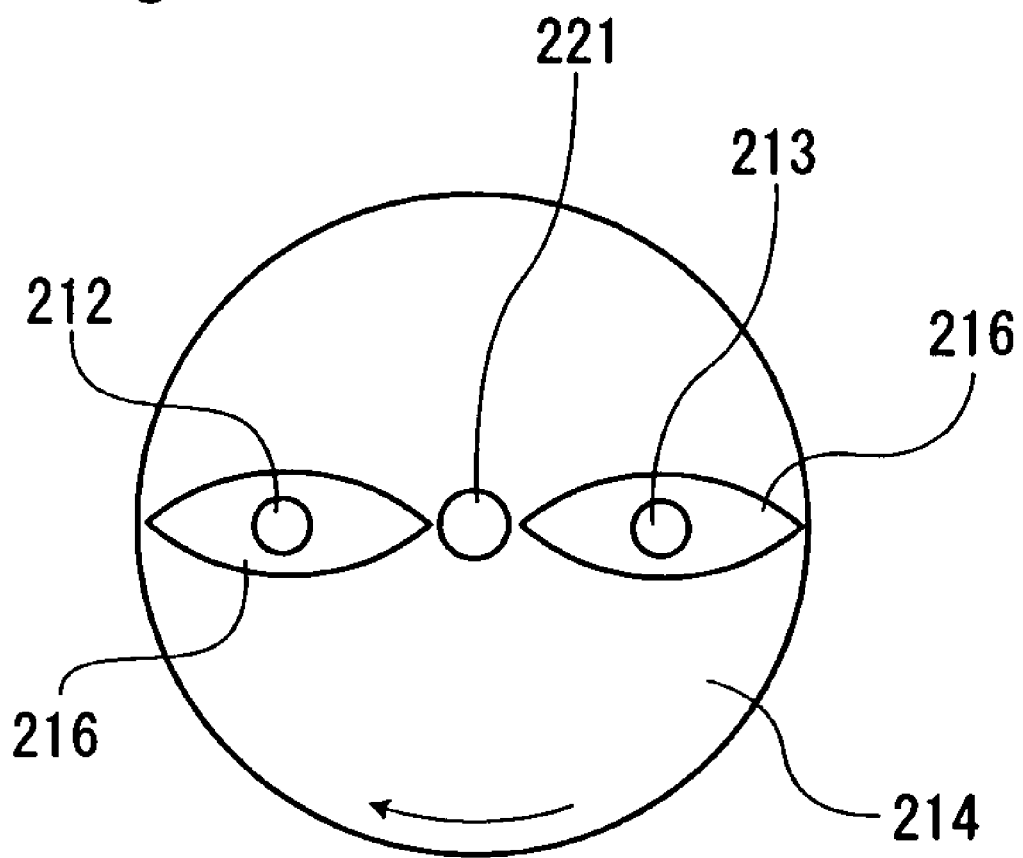
FIG. 3 is a layout view showing the vertical positional relationships among correction plates, a vapor deposition dome, a monitor substrate and vapor sources in the apparatus of FIG. 2.

FIG. 3 shows vertical positional relationships among the correction plates 216, the vapor deposition dome 214, the vapor sources 212 and 213, and the monitor substrate 221. The two correction plates 216 are fixed respectively on the upper side of the vapor sources 212 and 213, whereas the vapor deposition dome 214 is rotated. Of the particles flying from the vapor source 212, 213, the high-concentration portion is prevented from reaching the vapor deposition dome 214 by the correction plate 216; therefore, the distribution of the particles flying to the vapor deposition dome 214 can be made uniform by the correction plate 216. The correction plates 216 do not inhibit the flying particles from reaching the monitor substrate 221, and, therefore, the correction plates 216 have the function of conditioning the proportion of the film thickness of the layer formed on the vapor deposition dome 214 and the film thickness of the layer formed on the monitor substrate 221.

The particles of the thin film material evaporated from the vapor source 212, 213 are accelerated by an electric field (not shown) before reaching the vapor deposition dome 214 in the case of ion plating, or directly reach the vapor deposition dome 214 in the case of vacuum vapor deposition. The particles reach the light-transmitting substrate mounted on the vapor deposition dome 214 being rotated, and are deposited on the light-transmitting substrate, to form an optical film on the light-transmitting substrate. In this case, the portion high in particle density of the thin film material is blocked by the correction plate 216, so that a uniform film thickness distribution can be obtained. By switching the vapor source 212 on one side and the vapor source 213 on the other side, the two kinds of thin film materials can be deposited to form layers alternately. The two kinds of thin film materials are deposited to form layers alternately on the monitor substrate 221, simultaneously with the film formation on the light-transmitting substrate.

Figure 4:
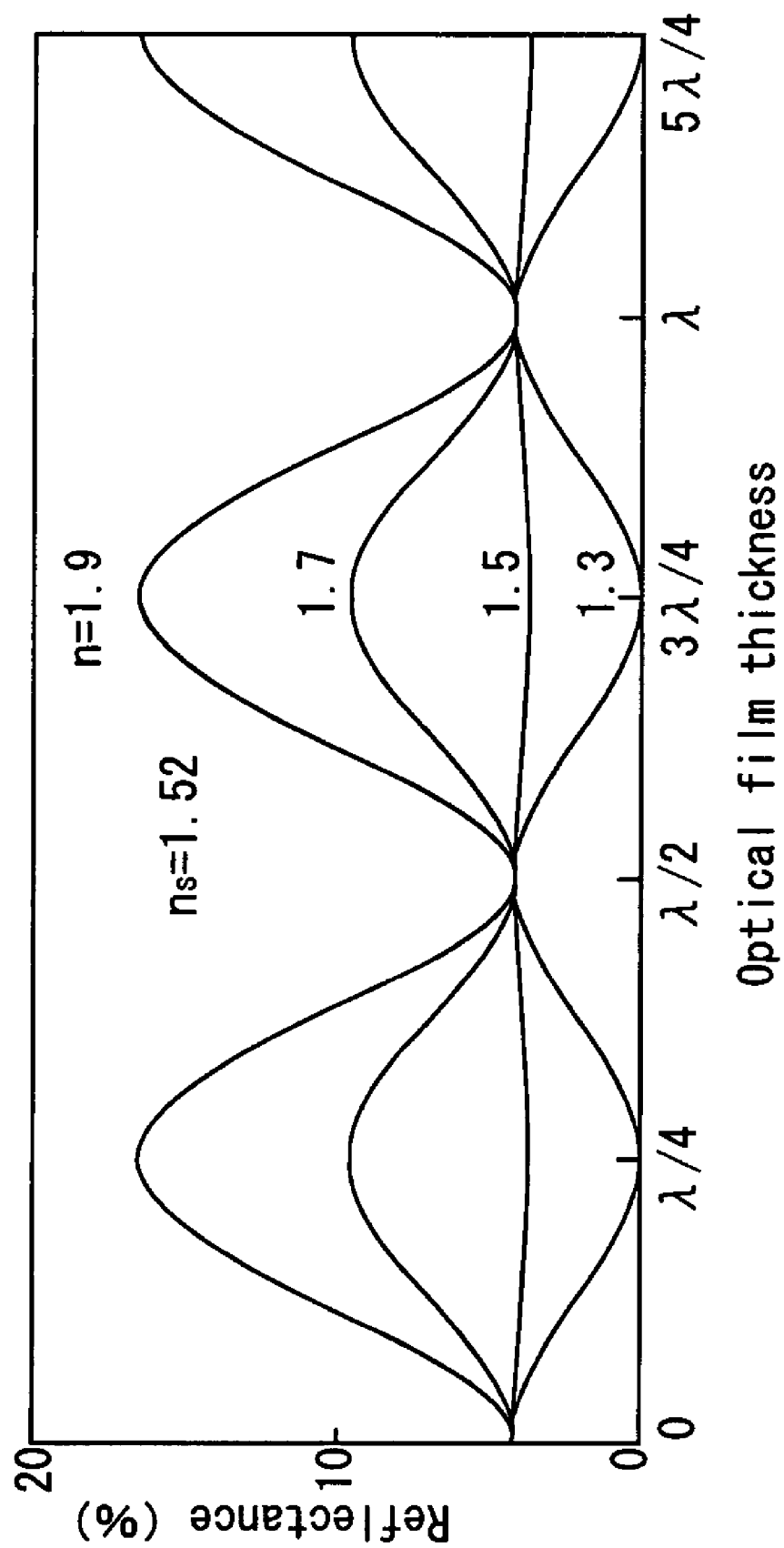
FIG. 4 is a graph showing the relationship between optical film thickness and reflectance, of a layer on the monitor substrate.

The optical film thickness meter 220 continuously measure, during film formation, the variation in the quantity of light reflected or transmitted at a designated wavelength (selected from the wavelength range usable with the film thickness sensor) by use of the film deposited on the monitor substrate 221, and the film formation is finished when a preliminarily computed light quantity change has occurred. The light quantity variation on the monitor substrate 221 shows peaks while repeating an increase and a decrease periodically each time the optical film thickness reaches an integer times of ¼ of the measurement wavelength λ, as shown in FIG. 4. Therefore, by determining the film formation amount based on such a peak, the actual optical film thickness can be controlled accurately, and, for this reason, the optical film thickness meter 220 is widely used for formation of an optical thin film.

Figure 5:
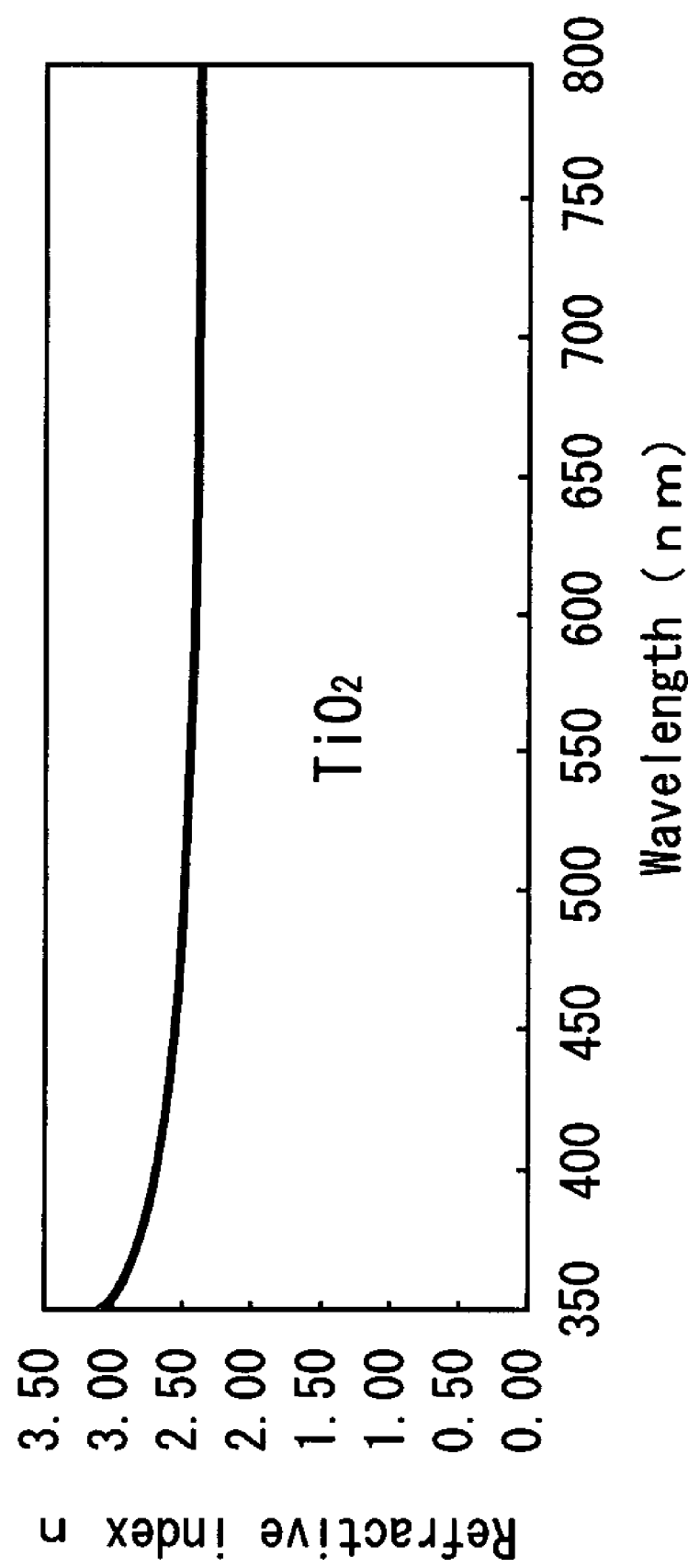
FIG. 5 is a graph showing the relationship between wavelength and refractive index, of a layer of $TiO_2$.

However, in the case of UV cutting, it is necessary to select a short wavelength as the design wavelength, and the film thickness of each layer is extremely small, so that it is difficult to control the film thickness. In addition, in the UV region, there is the problem that the accuracy of measurement becomes unstable because of large variations of optical constants such as refractive index of the substrate and the film, as seen from FIG. 5 which shows variation in the refractive index of $TiO_2$ with wavelength. Furthermore, in the film formation system using the optical film thickness meter, there arises the problem that the variation in light quantity becomes flat in the vicinity of a light quantity variation peak, so that it is difficult to decide the light quantity variation peak, and accuracy of control is conspicuously degraded. Moreover, where $TiO_2$ is used, the measurement of light quantity variation itself becomes difficult due to absorption by $TiO_2$, so that the accuracy of film formation is extremely worsened. Further, when the repetition number S is increased for realizing a steep leading edge characteristic, it becomes further more difficult to form the film intended. Conventionally, therefore, it has been impossible to achieve mass production where the stack number S is at least 10.

In the present invention, the difficulties in film thickness control at the time of film formation in the production of the UV cut filter as above-mentioned are overcome by making contrivances as to the balance of film thicknesses in the repeated alternate layer and the size of the correction plate, whereby it is made possible to control film thickness with high accuracy and to carry out mass production.

To be more specific, in the conventional designing, the ratio H/L of optical film thicknesses in the repeated alternate layer is set at 1.0. Where the ratio H/L is 1.0, the film formation must be stopped accurately when the reflectance on the monitor substrate reaches a peak, corresponding to an integer times of $\lambda/4$. In this case, the variation in light quantity becomes flat in the vicinity of the light quantity variation peak as measured by the optical film thickness meter, so that it is difficult to decide the light quantity variation peak.

In contrast, in the present invention, the ratio H/L or L/H in the repeated alternate layer is set within a range of from 1.2 to 2.0, preferably from 1.3 to 1.5; namely, a bias in thickness is introduced by setting one of the high-refractive-index layer and the low-refractive index layer to be thicker and the other to be thinner. In this case, if the bias is too heavy, a bad influence may be exerted on the filter characteristics.

As a result of the foregoing, at the time of forming the thicker layer, film formation is stopped when the peak of light quantity variation in the optical film thickness meter has been passed way, so that the timing for stopping the film formation becomes clear, and control of film thickness is facilitated. In addition, as for the control of film thickness of the thinner layer, the thinner layer is formed on the thicker layer and, therefore, film formation is stopped at the peak as usual; thus, no inconvenience arises from the setting of the layer to be thinner. Among others, by setting the high-refractive-index layer to be thicker, it is possible to form, with good film thickness accuracy, the high-refractive-index layer which has a small geometric film thickness and the film thickness of which is difficult to control.

Next, in the present invention, the width of the correction plate 216 is set to be larger than usual, whereby the proportion of the flying particles shielded by the correction plate 216 is increased. Specifically, where the ratio of the film thickness of the layer deposited on the light-transmitting substrate to the film thickness of the layer deposited on the monitor substrate is referred to as tooling coefficient, the tooling coefficient is set within a range of 0.6 to 0.85. When the tooling coefficient is too low, the amount of the particles deposited on the light-transmitting substrate will be too small, which is unfavorable from the viewpoint of productivity. The ordinary tooling coefficient in a conventional film formation apparatus is generally within a range of 0.9 to 1.1.

As a result of this, the layer deposited on the monitor substrate 221 becomes thicker than that deposited on the light-transmitting substrate, and the film thickness thereof can be measured accurately, thereby making it possible to solve the problem that optical constants such as refractive index would be unstable in the UV region. In addition, the peak of light quantity variation at the monitor substrate 221 precedes the peak in film formation on the light-transmitting substrate and, therefore, the film formation can be stopped when the peak in the light quantity variation has been passed way, so that the timing for stopping the film formation is made clear, and control of film thickness is facilitated. As a result, accuracy of film thickness can be enhanced.

By a combination of the improvement in the film thickness balance in the repeated alternate layer with the improvement of setting the tooling coefficient to be lower by setting the width of the correction plate to be larger, there is obtained an additional effect that film formation in forming the lower-refractive-index layer can be stopped when the peak of light quantity variation in the optical film thickness meter has been passed away, whereby control of film thickness is further facilitated.

Where the multi-layer film cut filter with the ratio H/L or L/H in the repeated alternate layer set within a range of 1.2 to 2.0 according to the present invention is used as a UV cut filter, the half-power point of leading edge is preferably selected within a wavelength range of 400 to 450 nm so that UV rays and short-wavelength visible rays can be cut. Particularly, where an ultra-high pressure mercury lamp is used as a light source, for improving the color balance of the light source it is preferable to set the half-power point within a range of 425 to 440 nm, particularly in the vicinity of 430 to 435 nm so that the peak near 440 nm of the light from the ultra-high pressure mercury lamp can be partly reflected by 10 to 30%, preferably about 10 to 20%.

On the side opposite to the side where the UV reflection film is provided of the light-transmitting substrate of the UV cut filter, an ordinary antireflection coating for enhancing light transmittance may be formed.

The multi-layer film cut filter according to the present invention is applicable to all filters that have a structure in which a dielectric multi-layer film comprising a repeated alternate film is formed on a light-transmitting substrate. Naturally, the multi-layer film cut filter according to the present invention is applicable not only to a UV cut filter but also to an IR cut filter, a dichroic filter, a cold mirror, etc.

EXAMPLE 1

The ratio H/L of film thicknesses in a repeated alternate layer was set at about 1.33, thereby setting a thickness balance to make the H layers thicker. The outermost layer and the first layer in contact with a substrate were formed of $SiO_2$.

As the material of the light-transmitting substrate, BK7 (a colorless glass plate with n=1.52) was used. As for the materials to constitute layers, $TiO_2$ was used for high-refractive-index layers (H), while $SiO_2$ was used for low-refractive-index layers (L), and film formation was conducted by use of an RF ion plating apparatus (a product by SHOWA SHINKU CO., LTD.). An optical film thickness meter of the monochromatic optical monitor system was used. Correction plates larger in width than usual was used, and the tooling coefficient was set at 0.8.

As for film thickness constitution, $\lambda$=360 nm, the number of layers was 33, and the multi-layer design was 1.08L, 0.44H, 1.04L, 0.88H, 0.80L, 1.16H, 0.76L, (1.12H, 0.84L)$^{10}$, 1.00H, 0.92L, 1.16H, 0.60L, 1.04H, 1.80L, in this order from the substrate side.

Figure 6:
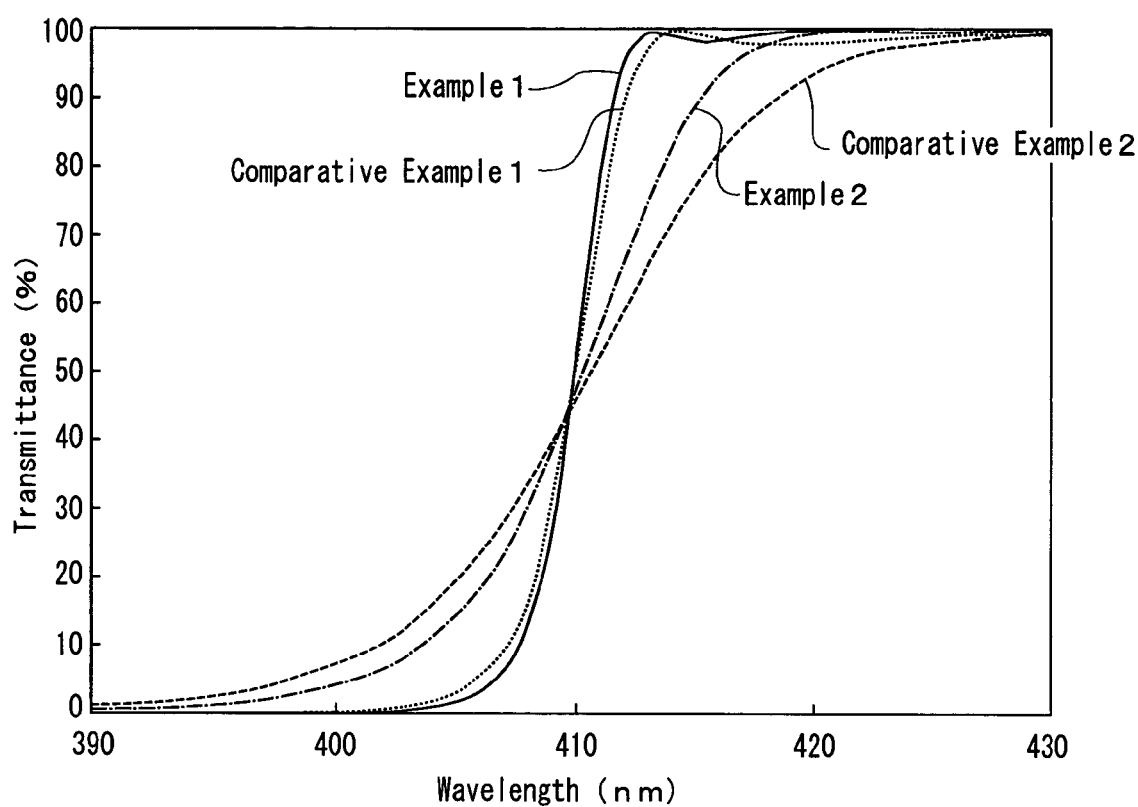
FIG. 6 is a graph showing the spectral transmittances at wavelengths near 410 nm of multi-layer film cut filters obtained in Examples 1 and 2, and Comparative Examples 1 and 2, respectively.
Figure 7:
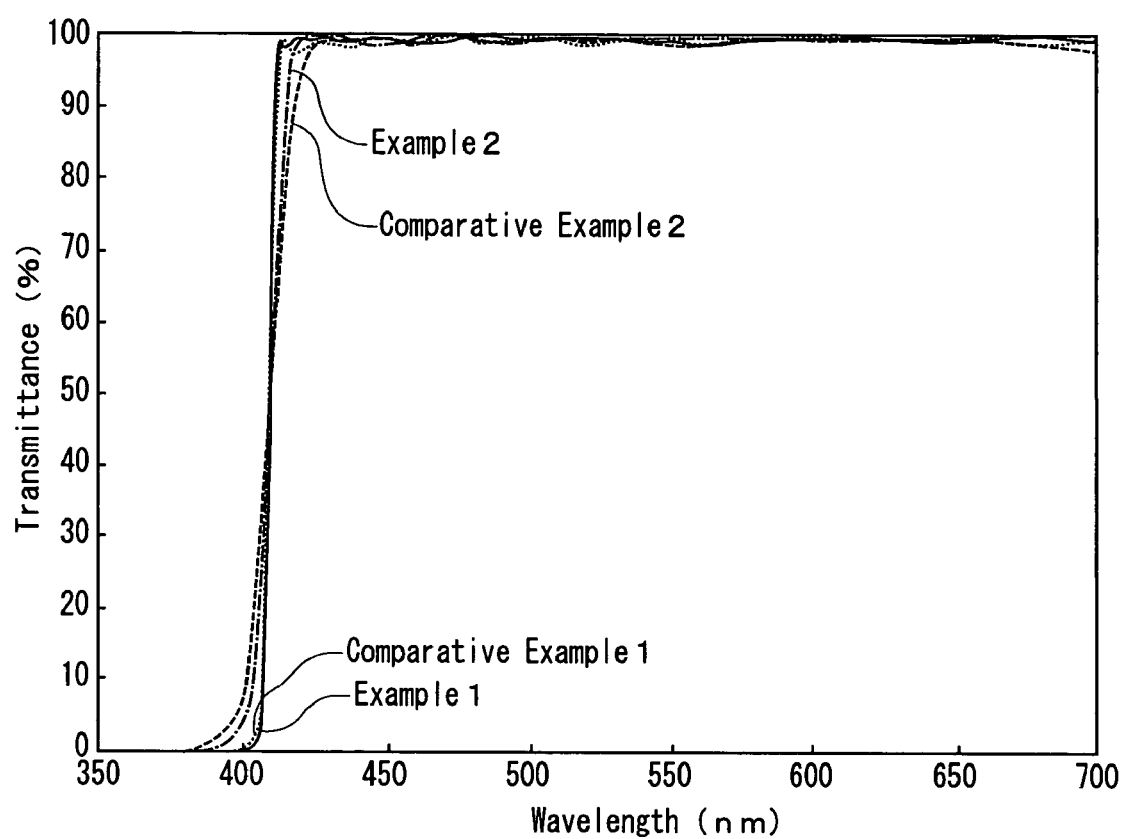
FIG. 7 is a graph showing the spectral transmittances in a wavelength range of 350 to 700 nm of multi-layer cut filters obtained in Examples 1 and 2, and Comparative Examples 1 and 2, respectively.

An enlarged spectral transmittance in the vicinity of a wavelength of 410 nm of the multi-layer film cut filter obtained is shown in FIG. 6. Besides, a spectral transmittance within a wavelength range of 350 to 700 nm is shown in FIG. 7.

Figure 8:
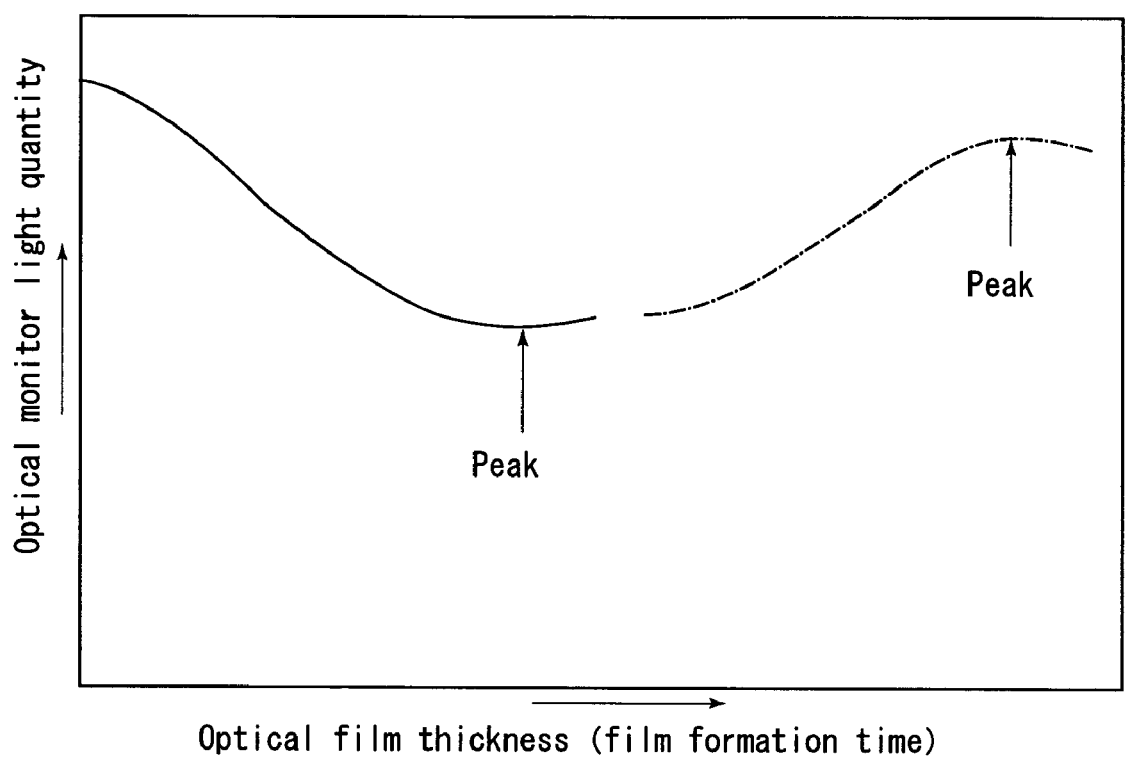
FIG. 8 is a graph showing light quantity variation of an optical monitor in Example 1.

In addition, the variation of reflectance measured by the optical film thickness meter for the repeated laminate layer is shown in FIG. 8. In the figure, the solid line corresponds to the film formation of the high-refractive-index layer, and the one-dotted chain line corresponds to the film formation of the low-refractive-index layer. The right end of each of the lines shows that the film formation was stopped at that time point.

EXAMPLE 2

Under the same film formation conditions as in Example 1, the film thickness constitution was so set that λ=360 nm, the number of layers was 19, and the multi-layer design was 1.08L, 0.44L, 1.04L, 0.88H, 0.80L, 1.16H, 0.76L, (1.12H, 0.84L)$^3$, 1.00H, 0.92L, 1.16H, 0.60L, 1.04H, 1.80L, in this order from the substrate side.

An enlarged spectral transmittance in the vicinity of a wavelength of 410 nm of the multi-layer film cut filter obtained is shown in FIG. 6. Besides, a spectral transmittance within a wavelength range of 350 to 700 nm is shown in FIG. 7.

This layer constitution is characterized in that the number of layers was reduced in consideration of productivity, and since the stack number in the repeated alternate layer was small, the steepness of the spectral characteristic was lowered.

COMPARATIVE EXAMPLE 1

Under the same film formation conditions as in Example 1, optimization according to the conventional design was conducted. The film thickness constitution was such that λ=360 nm, the number of layers was 33, and the multi-layer design was 1L, 0.3H, 0.94L, 1.1H, 0.58L, 1.3H, 0.79L, (1H, 1L)$^{10}$, 1.02H, 0.71L, 1.74H, 0.32L, 1.35H, 1.68L, in this order from the substrate side.

An enlarged spectral transmittance in the vicinity of a wavelength of 410 nm of the multi-layer film cut filter obtained is shown in FIG. 6. Besides, a spectral transmittance within a wavelength range of 350 to 700 nm is shown in FIG. 7.

Figure 9:
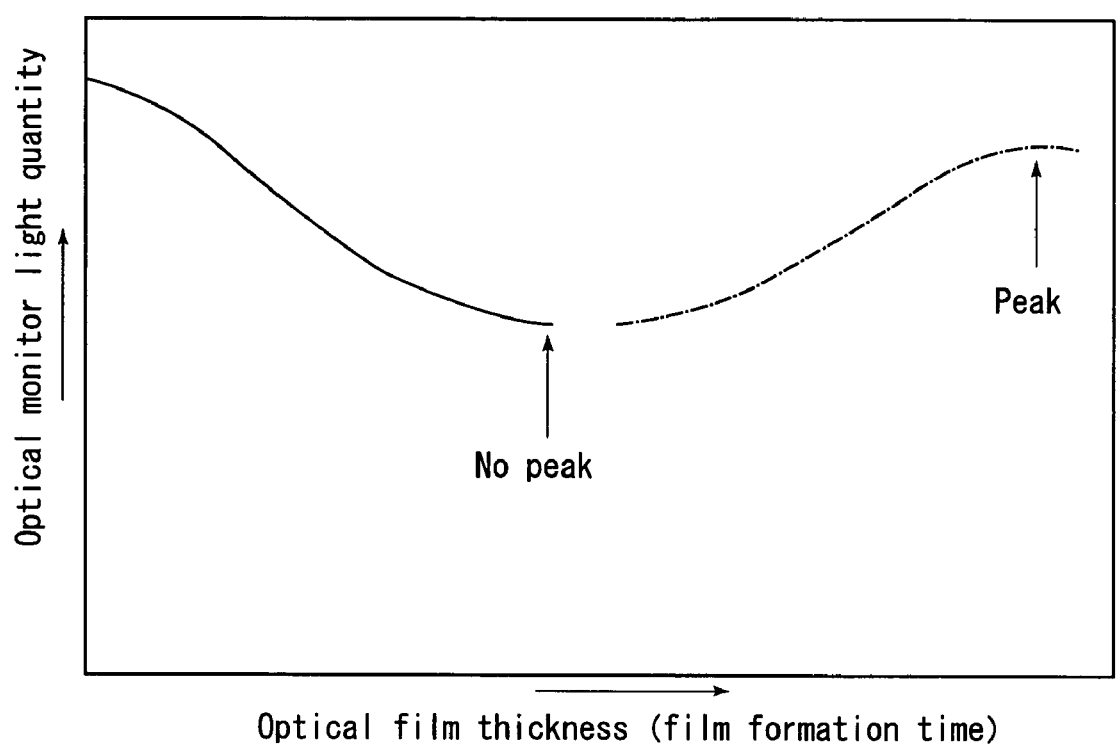
FIG. 9 is a graph showing light quantity variation of an optical monitor in Comparative Example 1.

In addition, the variation of reflectance measured by the optical film thickness meter for the repeated alternate layer is shown in FIG. 9. In the figure, the solid line corresponds to the film formation of the high-refractive-index layer, while the one-dotted chain line corresponds to the film formation of the low-refractive-index layer. The right end of each of the lines shows that the film formation was stopped at that time point.

COMPARATIVE EXAMPLE 2

Under the same film formation conditions as in Example 1, the film thickness constitution was so set that λ=360 nm, the number of layers was 19, and the multi-layer design was 1L, 0.3H, 0.94L, 1.1H, 0.58L, 1.3H, 0.79L, (1H, 1L)$^3$, 1.02H, 0.71L, 1.74H, 0.32L, 1.35H, 1.68L, in this order from the substrate side.

An enlarged spectral transmittance in the vicinity of a wavelength of 410 nm of the multi-layer film cut filter obtained is shown in FIG. 6. Besides, a spectral transmittance within a wavelength range of 350 to 700 nm is shown in FIG. 7.

Since the number of layers is small, the production of the multi-layer film cut filter was somewhat easy, but the steepness of spectral characteristic was poor.

Example 1 and Comparative Example 1 are equal in the number of layers, but are different in the balance of film thicknesses in the repeated alternate layer. Example 1 gave a steeper spectral characteristic. Similarly, Example 2 and Comparative Example 2 are equal in the number of layers, but are different in the balance of film thicknesses in the repeated alternate layer, and Example 2 gave a steeper spectral characteristic.

In addition, the variation in optical monitor light quantity shown in FIG. 9 shows that, in the film formation of the high-refractive-index layer in the repeated alternate layer according to the prior art with H/L=1.00, the film formation must be stopped at the crest of a peak, so that the decision of the timing for stopping the film formation is difficult to make, and control of film thickness is difficult to achieve. On the other hand, it is shown that, in forming the low-refractive-index layer, the film formation can be stopped when a peak has been passed way, owing to the effect of setting the tooling coefficient at 0.8, so that control of film thickness is easy to carry out.

In contrast, the variation in optical monitor light quantity in the present invention in which the balance of film thicknesses in the repeated alternate layer was set at H/L=1.33 as shown in FIG. 8 shows that, in forming the high-refractive-index layer, the film formation can be stopped when a peak has been passed way, so that control of film thickness is easy to carry out. It is also shown that, in forming the low-refractive-index layer, the film formation can be stopped when a peak has been passed way, owing to the effect of setting the tooling coefficient at 0.8, so that control of film thickness is easy to carry out.

EXAMPLE 3

A UV cut filter comprising a UV reflection film provided on one side of a light-transmitting substrate and an antireflection coating provided on the other side of the light-transmitting substrate was produced. The ratio H/L of film thicknesses in the repeated alternate layer was set at about 1.31, thereby setting a thickness balance to make the H layers thicker. The outermost layer and the first layer in contact with the substrate were formed of $SiO_2$.

As the material of the light-transmitting substrate, BK7 (a colorless glass plate with n=1.52) was used. As for the materials of layers, $TiO_2$ was used for high-refractive-index layers (H), while $SiO_2$ was used for low-refractive-index layers (L), and film formation was conducted by use of an RF ion plating apparatus (a product by SHOWA SHINKU CO., LTD.). An optical film thickness meter of the monochromatic optical monitor system was used. Correction plates broader than usual were used, and the tooling coefficient was set at 0.8.

The film thickness constitution was so set that the design wavelength=371 nm, the number of layers was 33, and the multi-layer design was 1L, 0.36H, 1.21L, 0.74H, 0.97L, 1.08H, 0.87L, 1.08H, (0.88L, 1.15H)$^8$, 0.88L, 1.12H, 0.9L, 1.01H, 1.02L, 1.03H, 0.71L, 1.09H, 1.75L, in this order from the substrate side. The half-power point is 433 nm.

In addition, as the antireflection coating, one having an ordinary four-layer constitution was formed. The film constitution was 0.23H, 0.4L, 2.17H, 1L, in this order from the substrate side (design wavelength: 550 nm).

Figure 10:
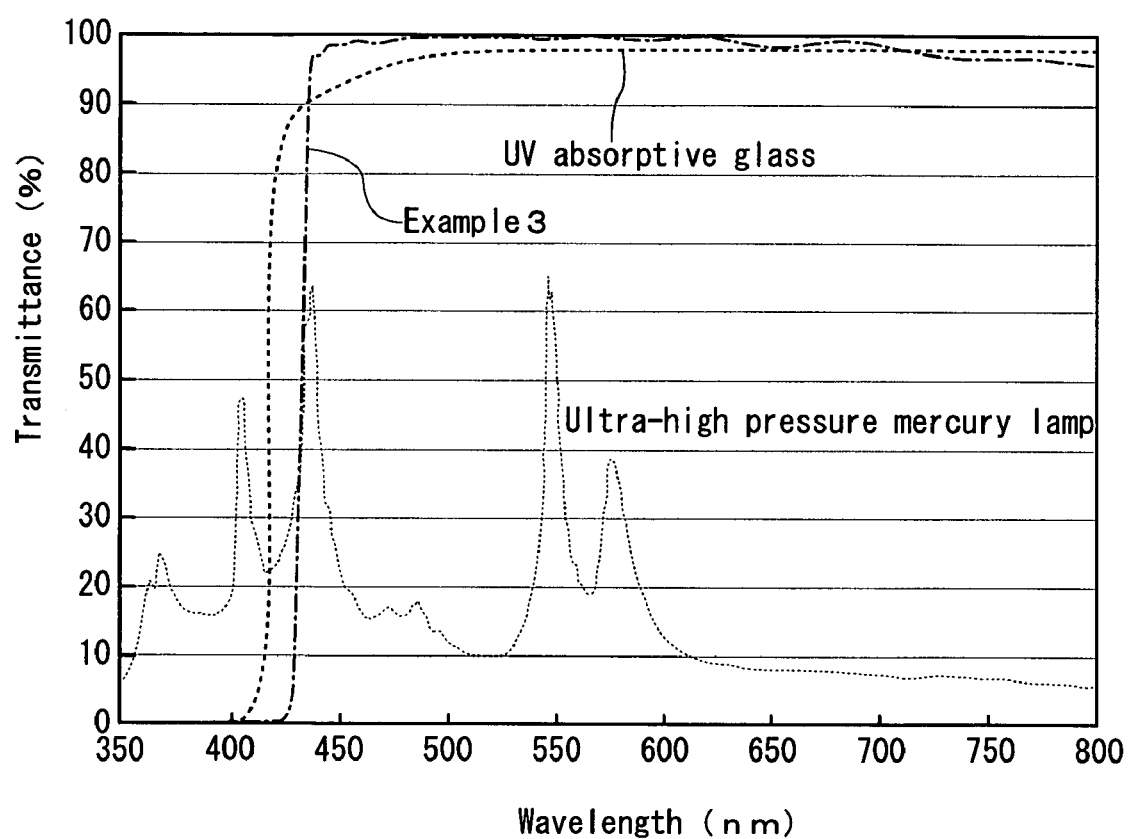
FIG. 10 is a graph showing spectral transmittances in a wavelength range of 350 to 800 nm of a multi-layer film cut filter obtained in Example 3.

A spectral transmittance of the multi-layer film cut filter obtained is shown in FIG. 10. In the figure, the one-dotted chain line indicates the spectral transmittance of the multi-layer film cut filter obtained, and the broken line indicates the spectral transmittance of one example of UV absorptive glass. In addition, the thin broken line indicates the luminance distribution of an ultra-high pressure mercury lamp.

In Example 3 as shown in FIG. 10, a spectral transmittance adjusted to the luminance characteristic of the ultra-high pressure mercury lamp was obtained. Specifically, the luminance characteristic of the ultra-high pressure mercury lamp shown in FIG. 10 is chacterized in that it is somewhat excessively rich in blue light, and, when only the light at the peak near 405 nm in the blue wavelength region is substantially cut, the blue light is still strong. Therefore, it is necessary to further cut the light near a wavelength of 440 nm, preferably the light within a wavelength range of 430 to 450 nm, by about 10 to 30%.

The transmittance characteristic of the UV absorptive glass is such that, although the peak near 405 nm can be cut substantially completely, it is difficult to enhance the transmittance at short wavelengths near the wavelengths to be cut because the transmittance variation is gradual in the vicinity of 440 nm. Therefore, attenuation of the light transmitted is generated. In addition, it is difficult to cut the light in a wavelength range of 430 to 450 nm by about 10 to 30%.

The multi-layer film cut filter obtained in Example 3, shown in FIG. 10, has a half-power point of 433 nm. Therefore, the peak near 405 nm can be cut substantially completely, and, at the same time, the light in a wavelength range of 430 to 450 nm can be cut by about 10 to 30%. By this, it is possible to cut a part of blue light emitted from the ultra-high pressure mercury lamp, which is excessively rich in blue, and thereby to improve the color balance. Moreover, since the leading edge is steep, it is possible to enhance the transmittance at short wavelengths near the wavelengths to be cut.

Next, a UV cut filter for attaining the third object and a projection type display unit for attaining the fourth object will be described.

The purposes of the UV cut filter 10 to be used in the projection type display unit 100 is to cut substantially completely UV rays at wavelengths of not more than 400 nm and a part of visible rays near the UV rays, to prevent deterioration of organic component parts by these rays, to prolong the life of the product, and, in the case of using an ultra-high pressure mercury lamp as a light source 101, to cut a part of blue light emitted from the ultra-high pressure mercury lamp, which is excessively rich in blue, and thereby to improve the color balance. The UV cut filter according to the present invention is characterized in that it has a transmittance characteristic adjusted to the luminance characteristic of the ultra-high pressure mercury lamp. Specifically, when only the light at the peak near 405 nm within the blue wavelength range of the ultra-high pressure mercury lamp shown in FIG. 17 is substantially cut, the blue light is still strong. In view of this, the UV cut filter according to the present invention further cuts partly the light at the peak near 440 nm by about 10 to 30%, preferably about 10 to 20%.

A first embodiment of the UV cut filter according to the present invention will be described referring to FIGS. 11(a) to 11(c).

Figure 11:
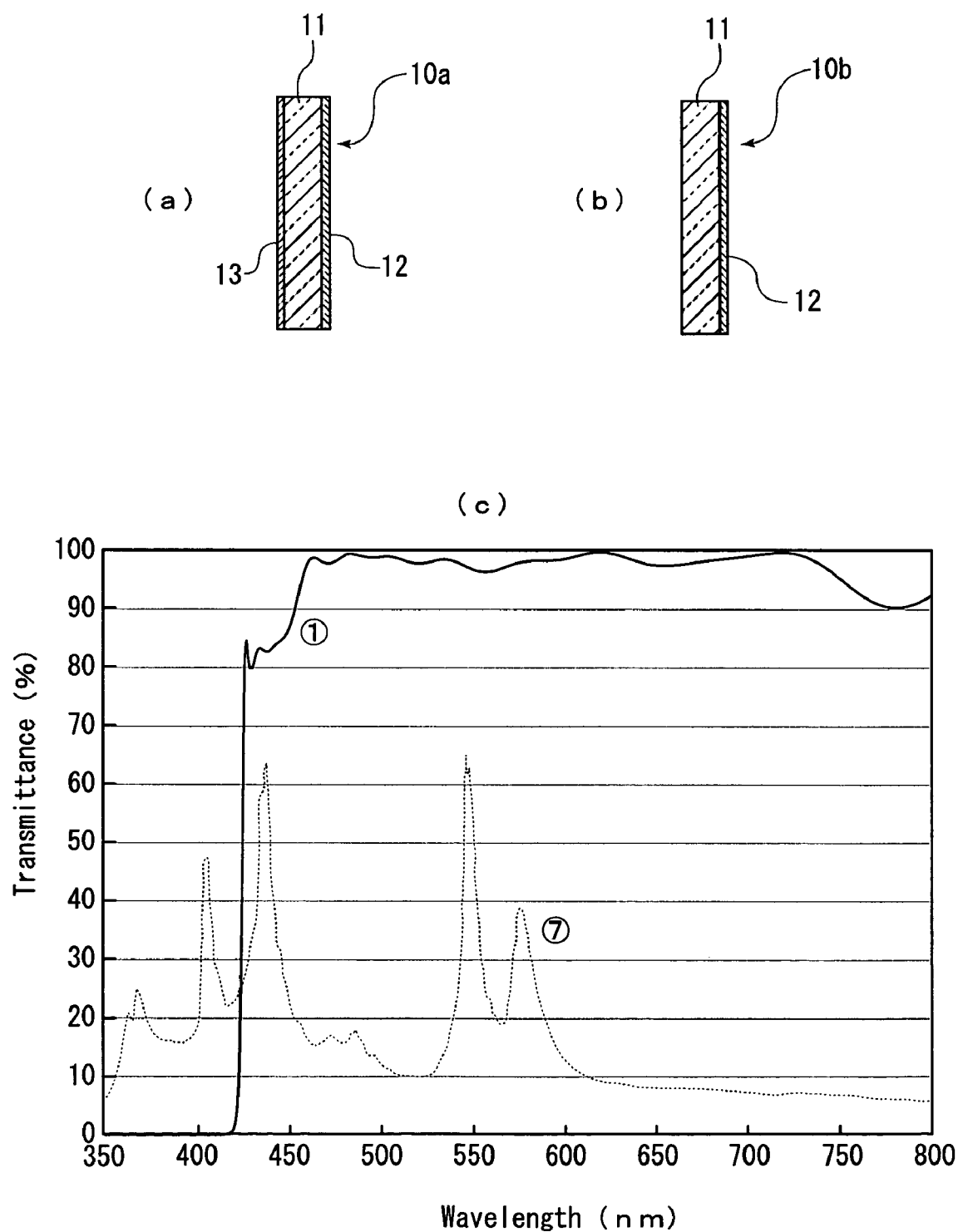
FIGS. 11(a) and 11(b) are sectional views showing the sectional structures of UV cut filters according to the present invention which each have a stepped UV reflection film.
FIG. 11(c) is a graph showing the spectral transmittances of the UV cut filters.

The UV cut filter 10a according to the first embodiment shown in FIG. 11(a) has a structure in which a stepped UV reflection film 12 is provided on one side of a light-transmitting substrate 11, and an antireflection coating 13 is provided on the other side of the light-transmitting substrate 11. On the other hand, the UV cut filter 10b according to the first embodiment shown in FIG. 11(b) has a structure in which a stepped UV reflection film 12 is provided on one side of a light-transmitting substrate 11, and no film is provided on the other side of the light-transmitting substrate 11.

As the light-transmitting substrate 11, one formed of a material which transmits visible rays may be used, and an inorganic glass is generally used as the material. Examples of the material which may be used include soda lime glass, borosilicate glass, lead glass, alkali-free glass, quartz glass, Neoceram, 7971 titanium silicate glass (a product by Corning), sapphire glass, etc.

The shape of the light-transmitting substrate 11 is generally a sheet-like shape, but, for example, an optical lens used in a projection type display unit can be used as the substrate of the UV cut filter according to the present invention.

For adjustment to the luminance characteristic of an ultra-high pressure mercury lamp, the transmittance characteristic of the stepped UV reflection film 12 is desirably such that it has a half-power point of 415 to 430 nm, an average transmittance of 70 to 90%, preferably an average transmittance of 80 to 90% in a wavelength range at the step of 430 to 450 nm, and a transmittance of at least 90%, preferably at least 95% in a wavelength range of 460 to 520 nm.

The stepped UV reflection film 12 having such a transmittance characteristic is a kind of above-mentioned multi-layer film cut filter, so that it can be designed by use of a commercial software for designing a multi-layer film structure.

In addition, for control of film thickness with high accuracy, the stepped UV reflection film 12 preferably has a ratio H/L or L/H in the repeated alternate layer within a range of 1.2 to 2.0, preferably 1.3 to 1.5, similarly to the multi-layer film cut filter according to the present invention. Further, at the time of physical film formation, it is preferable to interpose correction plates between vapor sources and the light-transmitting substrate, whereby a tooling coefficient, i.e., the ratio of the film thickness of the layer deposited on the light-transmitting substrate to the film thickness of the layer deposited on a monitor substrate is set within a range of 0.6 to 0.85.

The spectral transmittance of a stepped UV reflection film actually formed on BK7 (a colorless glass plate with n=1.52) in Example 4 which will be described later is indicated by the solid line ① in FIG. 11(c). In the figure, the broken line ⑦ indicates the luminance characteristic of an ultra-high pressure mercury lamp.

The stepped UV reflection film having the spectral transmittance ① is a 37-layer film filter composed of alternate lamination of $TiO_2$—$SiO_2$. The stepped UV reflection film has a half-power point of 425 nm, and an average transmittance of about 85% within a wavelength range (step) of 428 to 450 nm. The stepped UV reflection film has a high transmittance of at least 95% within a wavelength range of 460 to 520 nm.

Such a stepped UV reflection film may have a half-power point in the range of 415 to 430 nm, and, since the allowable range of the half-power point is thus broad, the production thereof is easy. If the half-power point is lower than 415 nm, the peak near 405 nm of the ultra-high pressure mercury lamp cannot be cut sufficiently, so that it is difficult to prevent deterioration of component parts. On the other hand, when the half-power point is higher than 430 nm, scatter of half-power point on a production basis leads to an influence on the transmittance at the peak near 440 nm, thereby loosing the meaning of the provision of the step.

Besides, the wavelength range of the step is set to be 430 to 450 nm, in order to condition the transmittance at the peak near 440 nm of the ultra-high pressure mercury lamp, thereby to suppress blue color and to condition the color balance. The average transmittance at the step is set in the range of 70 to 90%, preferably 80 to 90%, in view of the need to set the transmittance within such a range from the viewpoint of color balance.

Furthermore, it is necessary for the stepped UV reflection film to have a transmittance of at least 90%, preferably at least 95% in a wavelength range of 460 to 520 nm, since it is necessary to brighten the projected light by preventing the luminance of the light source from being lowered.

The antireflection coating 13 provided in the UV cut filter 10a shown in FIG. 11(a) has the function of suppressing the reflection on the surface of the light-transmitting substrate 11, thereby enhancing the transmittance for visible rays.

The antireflection coating 13 is composed of a single layer or a multiplicity of layers of an inorganic or organic film or films. Examples of the material of the inorganic film or films include inorganic materials such as $SiO_2$, $SiO$, $ZrO_2$, $TiO_2$, $TiO$, $Ti_2O_3$, $Ti_2O_5$ $Al_2O_3$, $Ta_2O_5$, $CeO_2$, $MgO$, $Y_2O_3$, $SnO_2$, $MgF_2$, $WO_3$, etc., which may be used singly or in combination of two or more thereof. In addition, in the case of a multi-layer film structure, high-refractive-index layers and low-refractive-index layers are alternately laminated on each other. In the case of the multi-layer film structure, the outermost layer is preferably formed of $SiO_2$, which is excellent in environmental resistance characteristic.

As a method for forming the inorganic film or films, there may be adopted, for example, a vacuum vapor deposition method, an ion plating method, a sputtering method, a CVD method, a method of depositing an inorganic material by a chemical reaction in a saturated solution, etc. An organic film or films can be formed not only by a vacuum vapor deposition method but also by coating methods such as a spin coating method, a dip coating method, etc.

The antireflection coating can also be theoretically designed by use of a commercial software, in the same manner as in designing the multi-layer film cut filter mentioned above.

The UV cut filter 10a shown in FIG. 11(a), comprising the stepped UV reflection film 12 and the antireflection coating 13, can be used as an independent UV cut filter because it is provided with the antireflection coating 13.

Besides, the UV cut filters 10a and 10b do not substantially absorb UV rays and are therefore free of heat generation, so that they can be used also as a dustproof glass for use in a liquid crystal display panel.

The UV cut filters 10a and 10b thus provided with the stepped UV reflection film 12 can reflect the UV rays and visible rays at wavelengths shorter than the peak near 405 nm of the ultra-high pressure mercury lamp by the appropriate setting of the half-power point, and can condition the transmittance for the peak near 440 nm by the step. Therefore, with the UV cut filters 10a and 10b, it is possible to prevent the deterioration of component parts by UV rays, to securely reduce the excessively rich blue color of the ultra-high pressure mercury lamp, and thereby to condition the color balance.

Next, a second embodiment of the UV cut filter according to the present invention will be described referring to FIGS. 12(a) and 12(b).

As shown in FIG. 12(a), the UV cut filter 10c according to the second embodiment has a structure in which a UV reflection film 14 is provided on one side of a light-transmitting substrate 11, and a blue conditioning film 15 as a reflective film for blue color is provided on the other side of the light-transmitting substrate 11.

The UV reflection film 14 in the UV cut filter 10c has a transmittance characteristic with a half-power point of 415 to 430 nm, and has the function of reflecting UV rays and visible rays at wavelengths shorter than the half-power point. If the half-power point is lower than 415 nm, the peak near 405 nm of the ultra-high pressure mercury lamp cannot be cut sufficiently, resulting in that it is difficult to prevent deterioration of component parts. When the half-power point is set to be higher than 430 nm, scatter of half-power point on a production basis leads to an influence on the transmittance at the peak near 440 nm, thereby loosing the meaning of the provision of the blue conditioning film. The UV reflection film 14 can be produced easily, since the allowable range for the half-power point is as broad as from 415 to 430 nm.

In addition, it is necessary for the blue conditioning film 15 to have the function of conditioning the transmittance at the peak near 440 nm of the ultra-high pressure mercury lamp, to have an average transmittance of 70 to 90%, preferably 80 to 90% in a wavelength range of 430 to 450 nm, and to have a transmittance of at least 90%, preferably at least 95% in a wavelength range of 460 to 520 nm. The average transmittance in the wavelength range of 430 to 450 nm is set to be 70 to 90%, preferably 80 to 90%, in view of the need to set the transmittance at the peak near 440 nm of the ultra-high pressure mercury lamp to within such a range from the viewpoint of color balance. Besides, it is necessary for the blue conditioning film 15 to have a transmittance of at least 90%, preferably at least 95% in the wavelength range of 460 to 520 nm, since it is necessary to brighten the projected light by preventing the luminance of the light source from being lowered.

The blue conditioning film 15 is constituted of a dielectric multi-layer film comprising an alternate lamination of a high-refractive-index layer and a low-refractive-index layer provided on a light-transmitting substrate. It should be noted here that, in the blue conditioning film 15, the number of layers laminated is much smaller than that in the UV reflection film, and there is no repeated alternate layer. The blue conditioning film 15 also can be designed by use of a commercial software for designing the multi-layer film cut filter mentioned above.

The spectral transmittance of the UV reflection film 14 actually formed on BK7 in Example 5 which will be described later is indicated by the broken line ② in FIG. 12(b), and the spectral transmittance of the blue conditioning film 15 is indicated by the one-dotted chain line ③ in FIG. 12(b). The spectral transmittance of the UV cut filter 10c comprising the combination of these films is indicated by the solid line ④. In the figure, the broken line ⑦ indicates the luminance characteristic of the ultra-high pressure mercury lamp.

The UV reflection film 14 having the transmittance characteristic shown in FIG. 12(b) is a 33-layer film composed of an alternate lamination of $TiO_2$—$SiO_2$ and having a half-power point of 425 nm. The blue conditioning film 15 is a 9-layer film of $TiO_2$—$SiO_2$, having an average transmittance in a wavelength range of 430 to 450 nm of about 85% and a transmittance of at least 96% in a wavelength range of 460 to 520 nm.

Since the half-power point of the UV reflection film 14 is 425 nm, the transmittance of the blue conditioning film 15 is predominant in the wavelength range of 430 to 450 nm, and, therefore, the transmittance of the UV cut filter 10c in the wavelength range of 430 to 450 nm is approximate to the transmittance of the blue conditioning film 15.

The UV cut filter 10c comprising the combination of the UV reflection film 14 and the blue conditioning film 15 as above can reflect UV rays and visible rays at wavelengths shorter than the peak near 405 nm of the ultra-high pressure mercury lamp by the UV reflection film 14, and can condition the transmittance at the peak near 440 nm substantially through the reflection by the blue conditioning film 14. Therefore, with the UV cut filter 10c, it is possible to prevent the deterioration of component parts by UV rays, to securely condition the excessively rich blue color of the ultra-high pressure mercury lamp and thereby to condition the color balance.

Incidentally, the UV cut filter 10c according to the second embodiment also does not substantially absorb UV rays and is therefore free of heat generation, so that it can be used also as a dustproof glass used in a liquid crystal display panel, as will be described later.

Next, a third embodiment of the UV cut filter according to the present invention will be described referring to FIGS. 13(a) and 13(b).

As shown in FIG. 13(a), the UV cut filter 10d according to the third embodiment has a structure in which the above-mentioned blue conditioning film 15 is provided on one side of a UV absorptive light-transmitting substrate 11b, and an antireflection coating 13 is provided on the other side.

The UV absorptive light-transmitting substrate 11b is formed of a UV absorptive glass, and has a performance insufficient for conditioning the transmittance at the peak near 440 nm of the ultra-high pressure mercury lamp. Therefore, the blue conditioning film 15 has the function of compensating for the performance of the UV absorptive light-transmitting substrate 11b, thereby conditioning the transmittance at the peak near 440 nm of the ultra-high pressure mercury lamp.

The UV absorptive light-transmitting substrate 11b has the function of absorbing UV rays and visible rays at wavelengths shorter than the peak near 405 nm of the ultra-high pressure mercury lamp, for which it is necessary that the half-power point is within a range of 415 to 430 nm. The transmittance characteristic of the blue conditioning film is the same as above-described.

In Example 6 which will be described later, a UV cut filter 10d comprising a blue conditioning film 15 composed of a 9-layer film of $TiO_2$—$SiO_2$ provided on one side of a UV absorptive glass 11b of 1.1 mm in thickness and an antireflection coating 13 on the other side was produced. The absorption characteristic of the UV absorptive glass 11b is indicated by the broken line ⑧ in FIG. 13(b), and the transmittance characteristic of the blue conditioning film 15 is indicated by the one-dotted chain line ③ in FIG. 13(b). The spectral transmittance of the UV cut filter 10d comprising the combination of the UV absorptive glass and the blue conditioning film is indicated by the solid line ⑤. In the figure, the thin broken line ⑦ indicates the luminance characteristic of an ultra-high pressure mercury lamp.

The transmittance characteristic ⑧ of the UV absorptive glass is such that the peak near 405 nm can be cut substantially completely, but the transmittance variation is gradual and the transmittance exceeds 90% in the vicinity of 440 nm, so that it is difficult to cut the light at the peak near 440 nm by about 10 to 30%.

In the transmittance characteristic of the UV cut filter 10d shown in FIG. 13(b), the influence of the transmittance of the blue conditioning film is heavy in the vicinity of 440 nm, and a step is observed there. The transmittance at 440 nm is about 75%.

The UV cut filter 10d comprising the UV absorptive glass 11b and the blue conditioning film 15 in combination as above can absorb UV rays and visible rays at wavelengths shorter than the peak in 405 nm of the ultra-high pressure mercury lamp by the UV absorptive glass 11b, and can condition the transmittance at the peak near 440 nm substantially by the blue conditioning film 15. Therefore, with the UV cut filter 10d, it is possible to prevent deterioration of component parts, to securely condition the excessively rich blue color of the ultra-high pressure mercury lamp, and thereby to condition the color balance.

EXAMPLE 4

A UV cut filter 10a comprising a stepped UV reflection film 12 provided on one side of a light-transmitting substrate 11 and an antireflection coating 13 provided on the other side of the light-transmitting substrate 11, as shown in FIG. 11(a), was produced.

Film formation was conducted by use of an RF ion plating apparatus (a product by SHOWA SHINKU CO., LTD.). An optical film thickness meter of the monochromatic optical monitor system was used. Correction plates larger in width than usual were used, and the tooling coefficient was set at 0.8. As the light-transmitting substrate 11, BK7 (a colorless glass plate with n=1.52) was used. As the stepped UV reflection film 12, a 37-layer film filter comprising an alternate lamination of $TiO_2$—$SiO_2$ was formed, the film constitution thereof being shown below, in which a high-refractive-index layer ($TiO_2$) is represented by H and a low-refractive-index layer ($SiO_2$) is represented by L.

The film constitution was 1L, 0.63H, 0.67L, 1.47H, 0.59L, $(1.16H, 0.83L)^5$, 1.08H, $(0.91L, 1.03H)^2$, 0.88L, $(1.26H, 0.77L)^5$, 0.88H, 1.14L, 1.04H, 0.67L, 1.04H, 1.9L, in this order from the substrate side (design wavelength: 370 nm). The spectral transmittance of the stepped UV reflection film 12 is indicated by the solid line ① in FIG. 11(c).

The stepped UV reflection film had a half-power point of 425 nm, and an average transmittance in a wavelength range of 428 to 450 nm (step) of about 85%. In a wavelength range of 460 to 520 nm, the transmittance was as high as at least 97%.

In addition, as the antireflection coating, one having an ordinary 4-layer constitution was formed. The film constitution was 0.23H, 0.4L, 2.17H, 1L, in this order from the substrate side (design wavelength: 550 nm).

EXAMPLE 5

A UV cut filter 10c comprising a UV reflection film 14 on one side of a light-transmitting substrate 11 and a blue conditioning film 15 on the other side of the light-transmitting substrate 11, as shown in FIG. 12(a), was produced.

Film formation was conducted by use of an RF ion plating apparatus (a product by SHOWA SHINKU CO., LTD.). An optical film thickness meter of the monochromatic optical monitor system was used. Correction plates larger in width than usual were used, and the tooling coefficient was set at 0.8. As the light-transmitting substrate 11, BK7 was used. As the UV reflection film 14, a 33-layer film UV cut filter comprising an alternate lamination of $TiO_2$—$SiO_2$ was formed, the film constitution thereof being shown below.

The film constitution was 1L, 0.36H, 1.21L, 0.74H, 0.97L, 1.08H, 0.87L, 1.08H, (0.88L, 1.15H)$^8$, 0.88L, 1.12H, 0.9L, 1.01H, 1.02L, 1.03H, 0.71L, 1.09H, 1.75L, in this order from the substrate side (design wavelength: 365 nm). The half-power point was 425 nm. The spectral transmittance of this UV reflection film is indicated by ② in FIG. 12(b).

In addition, as the blue conditioning film 15, a 9-layer film of $TiO_2(H)$—$SiO_2(L)$ was formed, the film constitution thereof being shown below.

The film constitution was 1.22L, 0.25H, 0.57L, 2.68H, 0.31L, 2.42H, 2.05L, 2.19H, 1.2L, in this order from the substrate side (design wavelength: 500 nm). The spectral transmittance of this blue conditioning film is indicated by ③ in FIG. 12(b).

The blue conditioning film had a transmittance of 87.3% at 430 nm, a transmittance of 84.3% at 440 nm, a transmittance of 89.3% at 450 nm, and an average transmittance of 85.8% in a wavelength range of 430 to 450 nm.

Besides, the spectral transmittance of the UV cut filter 10c comprising the UV reflection film and the blue conditioning film in combination is indicated by the solid line ④ in FIG. 12(b).

EXAMPLE 6

A UV cut filter 10d comprising a UV absorptive glass 11b of 1.1 mm in thickness as a light-transmitting substrate, the same blue conditioning film 15 as in Example 5 formed on one side of the UV absorptive glass 11b, and the same antireflection coating 13 as in Example 4 formed on the other side, as shown in FIG. 13(a), was produced.

The spectral transmittance of the UV absorptive glass is indicated by the broken line ⑧ in FIG. 13(b). Besides, the spectral transmittance of the blue conditioning film is indicated by the one-dotted chain line ③ in the figure. The spectral transmittance of the UV cut filter 10d comprising the UV absorptive glass and the blue conditioning film in combination is indicated by the solid line ⑤ in the figure.

Next, a dustproof glass for attaining the fifth object, a display panel for attaining the sixth object, and a projection type display unit for attaining the seventh object will be described.

Figure 14:
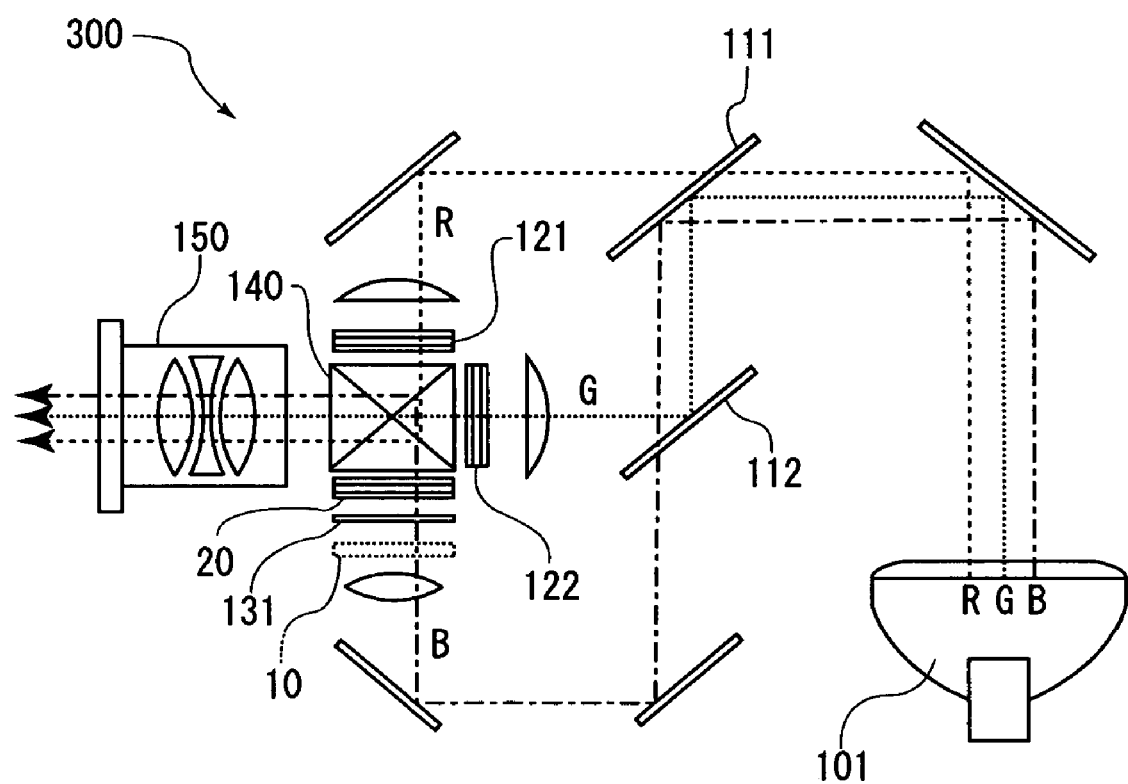
FIG. 14 is a constitutional view showing the general constitution of a liquid crystal projector as one embodiment of a projection type display unit according to the present invention.

FIG. 14 shows a general constitution of a liquid crystal projector as one embodiment of the projection type display unit according to the present invention.

The liquid crystal projector 300 differs from the liquid crystal projector 100 shown in FIG. 1 in that a display panel 20 according to the present invention is used as the third liquid crystal panel for modulating blue color and, attendant on this arrangement, the UV cut filter 10 is omitted. The other component parts are the same as in the liquid crystal projector 100 above, so that the same component parts as above are denoted by the same symbols as above and the description thereof is omitted.

In the conventional liquid crystal projector, on an optical path on the upstream side of a polarizing plate unit 131 disposed on the upstream side of the third liquid crystal panel 20 for modulating blue color, a UV cut filter 10 has been disposed for protecting these component parts from UV rays.

In the liquid crystal projector 300 shown in FIG. 14, the display panel according to the present invention which is provided with a UV reflection film is used as the third liquid crystal display panel 20, so that the UV cut filter 10 is unnecessary, the number of component parts can be reduced, compactness is enhanced, and cost is reduced.

Figure 15:
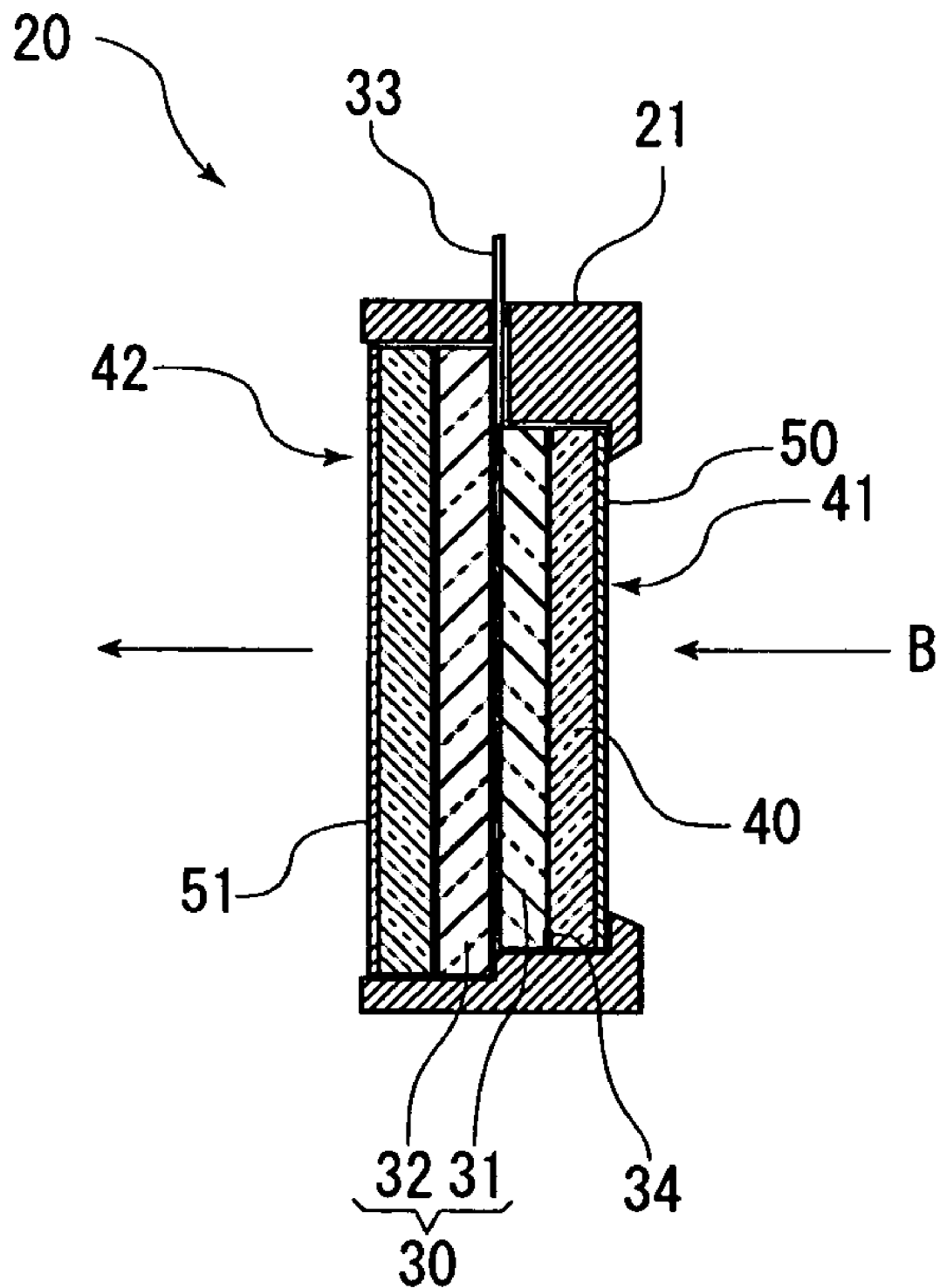
FIG. 15 is a sectional view showing the sectional structure of one embodiment of a display panel according to the present invention.

FIG. 15 shows a sectional view of one embodiment of the third liquid crystal display panel 20. The display panel 20 has a structure in which a counter substrate 31 and a liquid crystal substrate 32 for constituting a liquid crystal display unit 30 are spacedly disposed in a tetragonal tubular case 21. The counter substrate 31 is disposed on the incidence side, and counter electrodes and an oriented film (not shown) are formed on the inside surface of the counter substrate 31 which is opposed to the liquid crystal substrate 32. The liquid crystal substrate 32 is disposed on the emission side, and active devices such as TFTs and an oriented film (not shown) are formed on the inside surface of the liquid crystal substrate 32 which is opposed to the counter substrate 31. A liquid crystal layer (not shown) is sealed between the counter substrate 31 and the liquid crystal substrate 32. A flexible wiring 33 connects the exterior of the case and the liquid crystal display unit 30 to each other. A light-shielding film 34 called clearance is provided in a picture frame form on the outside surface of the counter substrate 31. An incidence side dustproof glass 41 is adhered to the incidence side surface of the counter substrate 31, and an emission side dustproof glass 42 is adhered to the emission side surface of the liquid crystal substrate 32.

The dustproof glasses 41 and 42 are for obviating the problem that when dust are deposited on the outside surfaces of the counter substrate 31 and the liquid crystal substrate 32, the dust would be enlargedly projected onto the display. Specifically, the dustproof glasses 41 and 42 have the function of spacing the dust from the liquid crystal display surface so as to achieve out-focusing, thereby making the deposition of the dust inconspicuous. Therefore, the dustproof glasses 41 and 42 have a large thickness of about 1.1 mm, and a glass such as quartz glass and Neoceram, the same material as the glass used in the liquid crystal substrate 32 and the counter substrate 31, is used therefor. The dustproof glasses 41 and 42 are adhered respectively to the liquid crystal substrate 32 and the counter substrate 31, in such a condition as not to generate bubbles, with a transparent adhesive such as a silicone-based adhesive and an acrylic adhesive so conditioned as to have a refractive index equal to that of the quartz glass or Neoceram being used.

An antireflection coating has been provided on the outside surface of the incidence side dustproof glass 41 in the prior art. On the other hand, in the present invention, a UV reflection film 50 is provided in place of the antireflection coating. The UV reflection film 50 is composed of a dielectric multi-layer film. By appropriately selecting the film design, it is possible to provide a steep characteristic such that light at wavelengths shorter than a specified wavelength is cut while light at longer wavelengths is transmitted. Thus, it is possible to reflect UV rays and, if required, short-wavelength visible rays, and to enhance the transmittance for required visible rays.

As shown in FIG. 17, the transmittance characteristic of the UV reflection film is characterized in that the leading edge (about 425 nm) is steeper, UV rays (below 400 nm) are reflected substantially completely, and the transmittance in the visible region (400 to 750 nm) on the longer wavelength side of the leading edge is higher, as compared with a UV absorptive glass. The transmittance for visible rays of a transparent glass substrate not provided with a UV reflection film is generally about 96%. Therefore, the UV reflection film functions as an antireflection coating in the visible region, and does not generate attenuation of the transmitted light; thus, the replacement of the conventional antireflection coating in the dustproof glass by the UV reflection film would not lead to a lowering in light quantity.

In addition, an antireflection coating 51 is provided on the outside surface of the emission side dustproof glass 42.

The first liquid crystal display panel 121 and the second liquid crystal display panel 122 used in the above-mentioned liquid crystal projector 300 have a structure in which the UV reflection film 50 of the display panel 10 according to the present invention is replaced with an antireflection coating, and have no other special difference in structure.

Incidentally, the dustproof glasses 41 and 42 may not be adhered to but be spaced from the counter substrate 31 and the liquid crystal substrate 32, respectively. Where the dustproof glasses 41 and 42 are spacedly disposed, air layers are intermediately present between the dustproof glasses 41 and 42 and the counter substrate 31 and the liquid crystal substrate 32, and reflection of light is thereby generated; in view of this, antireflection coatings are provided on the inner sides of the dustproof glasses 41 and 42 and on the outer sides of the counter substrate 31 and the liquid crystal substrate 32.

The display panel 20 according to the present invention comprises the dustproof glass 41 provided with the UV reflection film 50 on the incidence side, so that it can reflect UV rays and, if required, short-wavelength visible rays by the UV reflection film 50, whereby only the required visible rays can be incident on the liquid crystal display unit 30. Therefore, the liquid crystal display unit 30 can be protected from UV rays, deterioration of the oriented film and other organic matters by UV rays can be prevented, and reliability can be enhanced. In addition, the liquid crystal display unit 30 and the dustproof glass 41 can be prevented from being heated to a high temperature through absorption of UV rays, and generation of non-uniformity or the like in the projected image is obviated.

FIGS. 16(a) and 16(b) show sectional structures of embodiments of the dustproof glass according to the present invention. FIG. 16(a) shows a dustproof glass of the type of being adhered to the liquid crystal display unit, and FIG. 16(b) shows a dustproof glass of the type of being spaced from the liquid crystal display unit.

The dustproof glass 41 shown in FIG. 16(a) has a structure in which a UV reflection film 50 is provided on one side of a transparent glass substrate 40, and no film is provided on the other side. The transparent glass substrate 40 is formed of a glass which is the same material as the counter substrate 31. Examples of the glass include quartz glass, Neoceram, 7971 titanium silicate glass (a product by Corning), sapphire glass, etc. The thickness of the transparent glass substrate 40 is about 0.7 to 3 mm, such a value that dust can be spaced sufficiently from the incidence surface of the counter substrate 31 and can thereby be set out of focus. Too large a thickness leads to the problems of a lowering of heat radiation property and an increase in weight.

As shown in FIG. 15, the dustproof glass 41 is used as a part of the display panel 20 in such a manner that its surface not provided thereon with a film is adhered, with an adhesive, to the incidence side substrate surface of the liquid crystal display unit 30 on which the UV-containing light from the light source is incident.

The dustproof glass 43 shown in FIG. 16(b) has a structure in which a UV reflection film 50 is provided on one side of a transparent glass substrate 40, and an antireflection coating 51 is provided on the other side. The dustproof glass 43 is spaced from the incidence side substrate surface of the liquid crystal display unit 30 on which the UV-containing light from the light source is incident, with its UV reflection film 50 on the outside and with its antireflection coating 51 on the inside, and is used as a part of the liquid crystal display panel. The transparent glass substrate 40 of the dustproof glass 43 may be made of a material different from that of the counter substrate 31, and, generally, an inorganic glass is used as the material. Examples of the material include soda lime glass, borosilicate glass, lead glass, alkali-free glass, quartz glass, Neoceram, 7971 titanium silicate glass (a product by Corning), sapphire glass, etc.

As the UV reflection film 50, there may be used a UV reflection film used in a UV cut filter which can reflect UV rays having wavelengths shorter than 400 nm. In a projection type display unit using an ultra-high pressure mercury lamp as a light source, it is preferable to set a half-power point in a range of 425 to 440 nm, particularly in the vicinity of 430 to 435 nm, so that the peak near 440 nm of the ultra-high pressure mercury lamp can be partly reflected by 10 to 30%, preferably about 10 to 20%. As such a UV reflection film, there can be used the multi-layer film cut filter according to the present invention in which the ratio H/L or L/H indicating the balance in optical film thickness between a high-refractive-index layer H and a low-refractive-index layer L in the repeated alternate layer is set within a range of 1.2 to 2.0.

In addition, as a particularly preferable UV reflection film in the case where the light source 101 is an ultra-high pressure mercury lamp, the above-mentioned stepped UV reflection film 14 can be used preferably. Therefore, as the dustproof glass 41 according to the present invention of the type of being adhered to the liquid crystal display unit 30, there can be preferably adopted the UV cut filter 10b having a structure as shown in FIG. 11(b) in which the stepped UV reflection film 12 is provided on one side of the light-transmitting substrate 11, and no film is provided on the other side of the light-transmitting substrate 11. Besides, as the dustproof glass 43 of the type of being spaced from the liquid crystal display unit 30, there can be preferably adopted the UV cut filter 10a having a structure as shown in FIG. 11(a) in which the stepped UV reflection film 12 is provided on one side of the light-transmitting substrate 11, and the antireflection coating 13 is provided on the other side of the light-transmitting substrate 11.

Furthermore, as the dustproof glass of the type of being spaced from the liquid crystal display unit 30, there can be preferably adopted the UV cut filter 10c having a structure as shown in FIG. 12(a) in which the UV reflection film 14 is provided on one side of the light-transmitting substrate 11, and the blue conditioning film 15 as a reflective film for blue color is provided on the other side of the light-transmitting substrate 11.

As has been described above, the multi-layer film cut filter according to the present invention differs from the conventional one in film thickness balance of the repeated alternate layer, whereby control of film thickness is facilitated, and the multi-layer film can be formed with high accuracy, resulting in that the multi-layer film cut filter has characteristics as designed.

According to the method of producing a multi-layer cut filter according to the present invention, the tooling coefficient is set low so that a thicker layer is formed on the monitor substrate, whereby control of film thickness is facilitated, and a multi-layer film cut filter having characteristics as designed can be produced.

The UV cut filter according to the present invention uses the stepped UV reflection film, whereby the UV cut filter is provided with transmittance characteristic adjusted to the luminance characteristic of an ultra-high pressure mercury lamp, deterioration of component parts by UV rays can be prevented, the excessively rich blue color of the ultra-high pressure mercury lamp can be securely reduced, and color balance can thereby be conditioned.

In addition, the UV cut filter according to the present invention comprises the UV reflection film and the blue conditioning film in combination, whereby the UV cut filter is provided with transmittance characteristic adjusted to the luminance characteristic of an ultra-high pressure mercury lamp, deterioration of component parts by UV rays can be prevented, the excessively rich blue color can be securely reduced, and color balance can thereby be conditioned.

The UV cut filter according to the present invention comprises the UV absorptive glass and the blue conditioning film in combination, whereby the UV cut filter is provided with transmittance characteristic adjusted to the luminance characteristic of an ultra-high pressure mercury lamp, deterioration of component parts by UV rays can be prevented, the excessively rich blue color of the ultra-high pressure mercury lamp can be securely reduced, and color balance can thereby be conditioned.

The projection type display unit according to the present invention uses the UV cut filter having transmittance characteristic adjusted to the luminance characteristic of an ultra-high pressure mercury lamp, whereby deterioration of component parts by UV rays can be prevented, and the excessively rich blue color of the ultra-high pressure mercury lamp can be securely reduced, to obtain a good color balance.

The dustproof glass according to the present invention is provided with the UV reflection film in place of the antireflection coating, whereby the dustproof glass is provided with such a characteristic as to reflect harmful UV rays and the like without lowering the transmittance for useful visible rays.

The display panel according to the present invention has a structure in which the dustproof glass provided thereon with the UV reflection film is incorporated therein, whereby the display unit can be protected from UV rays without using a UV cut filter as a component part.

The projection type display unit according to the present invention uses the display panel in which the dustproof glass provided thereon with the UV reflection film is incorporated, whereby a UV cut filter as a component part is unnecessitated, and the number of component parts can thereby be reduced.

INDUSTRIAL APPLICABILITY

The filter according to the present invention is used, for example, in a projection type display unit, and can be applied to the use for cutting harmful UV rays and short-wavelength visible rays from UV-containing light emitted from a light source, thereby preventing deterioration of component parts by UV rays and the like.

The method of producing a multi-layer film cut filter according to the present invention makes it possible to produce a filter used for the purpose of cutting harmful UV rays and short-wavelength visible rays from UV-containing light emitted from a light source, thereby preventing deterioration of component parts by UV rays and the like.

The dustproof glass according to the present invention is incorporated, for example, in a liquid crystal display panel of a projection type display unit, and can be applied to the use for cutting harmful UV rays and short-wavelength visible rays from UV-containing light emitted from a light source, thereby preventing deterioration of the display panel by UV rays and the like.

The projection type display unit according to the present invention can be applied to the use for enlarged projection of images onto a screen.

The invention claimed is:

1. A multi-layer film cut filter comprising a dielectric multi-layer film formed on a light-transmitting substrate, said dielectric multi-layer film comprising a repeated alternate layer composed of a repeated alternate lamination of a high-refractive-index layer and a low-refractive-index layer in an equal optical film thickness, wherein
   the ratio H/L or L/H in said repeated alternate layer is within a range of 1.2 to 2.0, where H is the optical film thickness of said high-refractive-index layer and L is the optical film thickness of said low-refractive-index layer.

2. A method of producing a multi-layer film cut filter, comprising the steps of repeatedly building up particles flying from a vapor source for forming high-refractive-index layers and particles flying from a vapor source for forming low-refractive-index layers on a light-transmitting substrate, simultaneously building up layers also on a monitor substrate, and conducting film thickness control while measuring the optical film thickness of said layer formed on said monitor substrate, wherein
   a correction plate is interposed between said vapor source and said light-transmitting substrate, and a tooling coefficient, which is the ratio of the film thickness of said layer deposited on said light-transmitting substrate to the film thickness of said layer deposited on said monitor substrate, is set within a range of 0.6 to 0.85.

3. A method of producing a multi-layer film cut filter as set forth in claim 2, wherein
   a repeated alternate layer composed of a repeated alternate lamination of said high-refractive-index layer and said low-refractive-index layer in respectively equal optical film thicknesses is formed, and
   the ratio H/L or L/H in said repeated alternate layer is within a range of 1.2 to 2.0, where H is the optical film thickness of said high-refractive-index layer and L is the optical film thickness of said low-refractive-index layer.

4. A UV cut filter wherein a stepped UV reflection film having a half-power point of 415 to 430 nm, an average transmittance of 70 to 90% in a wavelength range of 430 to 450 nm, and a transmittance of at least 90% in a wavelength range of 460 to 520 nm is provided on one side of a light-transmitting substrate.

5. A UV cut filter as set forth in claim 4, wherein
   said stepped UV reflection film is comprised of a dielectric multi-layer film, which comprises a repeated alternate layer composed of a repeated alternate lamination of a high-refractive-index layer and a low-refractive-index layer in respectively equal optical film thicknesses, and
   the ratio H/L or L/H in said repeated alternate layer is within a range of 1.2 to 2.0, where H is the optical film thickness of said high-refractive-index layer and L is the optical film thickness of said low-refractive-index layer.

6. A UV cut filter wherein a UV reflection film having a half-power point of 415 to 430 nm is provided on one side of a light-transmitting substrate, and a blue conditioning film having an average transmittance of 70 to 90% in a wavelength range of 430 to 450 nm and a transmittance of at least 90% in a wavelength range of 460 to 520 nm is provided on the other side of said light-transmitting substrate.

7. A UV cut filter as set forth in claim 6, wherein
said UV reflection film is comprised of a dielectric multi-layer film, which comprises a repeated alternate layer composed of a repeated alternate lamination of a high-refractive-index layer and a low-refractive-index layer in respectively equal optical film thicknesses, and
the ratio H/L or L/H in said repeated alternate layer is within a range of 1.2 to 2.0, where H is the optical film thickness of said high-refractive-index layer and L is the optical film thickness of said low-refractive-index layer.

8. A UV cut filter wherein a blue conditioning film having an average transmittance of 70 to 90% in a wavelength range of 430 to 450 nm and a transmittance of at least 90% in a wavelength range of 460 to 520 nm is provided on one side of a UV absorptive light-transmitting substrate having an absorptive characteristic with a half-power point of 415 to 430 nm.

9. A projection type display unit comprising a light source constituted of an ultra-high pressure mercury lamp, a display panel for forming a predetermined image by modulating light from said light source, a UV cut filter disposed on an optical path between said light source and said display panel, and an enlarged-projection optical system for enlarged projection of light emitted from said display panel, wherein
said UV cut filter comprises a stepped UV reflection film provided on one side of a light-transmitting substrate, said stepped UV reflection film having a half-power point of 415 to 430 nm, an average transmittance of 70 to 90% in a wavelength range of 430 to 450 nm, and a transmittance of at least 90% in a wavelength range of 460 to 520 nm.

10. A projection type display unit comprising a light source constituted of an ultra-high pressure mercury lamp, a display panel for forming a predetermined image by modulating light from said light source, a UV cut filter disposed on an optical path between said light source and said display panel, and an enlarged-projection optical system for enlarged projection of light emitted from said display panel, wherein
said UV cut filter has a structure in which a UV reflection film having a half-power point of 415 to 430 nm is provided on one side of a light-transmitting substrate, and a blue conditioning film having an average transmittance of 70 to 90% in a wavelength range of 430 to 450 nm and a transmittance of at least 90% in a wavelength range of 460 to 520 nm is provided on the other side of said light-transmitting substrate.

11. A projection type display unit comprising a light source constituted of an ultra-high pressure mercury lamp, a display panel for forming a predetermined image by modulating light from said light source, a UV cut filter disposed on an optical path between said light source and said display panel, and an enlarged-projection optical system for enlarged projection of light emitted from said display panel, wherein
said UV cut filter has a structure in which a blue conditioning film having an average transmittance of 70 to 90% in a wavelength range of 430 to 450 nm and a transmittance of at least 90% in a wavelength range of 460 to 520 nm is provided on one side of a UV absorptive light-transmitting substrate having an absorption characteristic with a half-power point of 415 to 430 nm.

12. A dustproof glass for preventing deposition of dust on a display unit for forming a predetermined image by modulating light from a light source, said dustproof glass disposed on the upstream side of said display unit on which said light from said light source is incident on said display unit, wherein
a UV reflection film is provided on one side of a transparent glass substrate and,
said UV reflection film is comprised of a dielectric multi-layer film, which comprises a repeated alternate layer composed of a repeated alternate lamination of a high-refractive-index layer and a low-refractive-index layer in respectively equal film thicknesses, and
the ratio H/L or L/H in said repeated alternate layer is in the range of 1.2 to 2.0, where H is the optical film thickness of said high-refractive-index layer and L is the optical film thickness of said low-refractive-index layer.

13. A dustproof glass as set forth in claim 12, wherein
said UV reflection film is a stepped UV reflection film having a half-power point of 415 to 430 nm, an average transmittance of 70 to 90% in a wavelength range of 430 to 450 nm, and a transmittance of at least 90% in a wavelength range of 460 to 520 nm.

14. A dustproof glass as set forth in claim 12, wherein
a UV reflection film having a half-power point of 415 to 430 nm is provided on one side of said transparent glass substrate, and a blue conditioning film having an average transmittance of 70 to 90% in a wavelength range of 430 to 450 nm and a transmittance of at least 90% in a wavelength range of 460 to 520 nm is provided on the other side of said transparent glass substrate.

15. A display panel comprising a display unit for forming a predetermined image by modulating light from a light source, and a dustproof glass for preventing deposition of dust on said display unit, said dustproof glass disposed on the upstream side of said display unit on which said light from said light source is incident on said display unit, wherein
said dustproof glass comprises a UV reflection film on the upstream side of a transparent glass substrate, and
said UV reflection film is comprised of a dielectric multi-layer film, which comprises a repeated alternate layer composed of a repeated alternate lamination of a high-refractive-index layer and a low-refractive-index layer in respectively equal film thicknesses, and
the ratio H/L or L/H in said repeated alternate layer is in the range of 1.2 to 2.0, where H is the optical film thickness of said high-refractive-index layer and L is the optical film thickness of said low-refractive-index layer.

16. A display panel as set forth in claim 15, wherein
said UV reflection film is a stepped UV reflection film having a half-power point of 415 to 430 nm, an average transmittance of 70 to 90% in a wavelength range of 430 to 450 nm, and a transmittance of at least 90% in a wavelength range of 460 to 520 nm.

17. A display panel as set forth in claim 15, wherein
said dustproof glass has a structure in which a UV reflection film having a half-power point of 415 to 430 nm is provided on one side of said transparent glass substrate, and a blue conditioning film having an average transmittance of 70 to 90% in a wavelength range of 430 to 450 nm and a transmittance of at least 90% in a wavelength range of 460 to 520 nm is provided on the other side of said transparent glass substrate.

18. A projection type display unit comprising: a light source; a display panel comprising a display unit for forming a predetermined image by modulating light from said light source, and a dustproof glass for preventing deposition of dust on said display unit, said dustproof glass disposed on the upstream side of said display unit on which said light from said light source is incident on said display unit; and an enlarged-projection optical system for enlarged projection of light emitted from said display panel, wherein said dustproof glass comprises a UV reflection film on the upstream side of a transparent glass substrate, and said UV reflection film is comprised of a dielectric multi-layer film, which comprises a repeated alternate layer composed of a repeated alternate lamination of a high-refractive-index layer and a low-refractive-index layer in respectively equal optical film thicknesses, and the ratio H/L or L/H in said repeated alternate layer is in the range of 1.2 to 2.0, where H is the optical film thickness of said high-refractive-index layer and L is the optical film thickness of said low-refractive-index layer.

19. A projection type display unit as set forth in claim 18, wherein said UV reflection film is a stepped UV reflection film having a half-power point of 415 to 430 nm, an average transmittance of 70 to 90% in a wavelength range of 430 to 450 nm, and a transmittance of at least 90% in a wavelength range of 460 to 520 nm.

20. A projection type display unit as set forth in claim 18, wherein said dustproof glass has a structure in which a UV reflection film having a half-power point of 415 to 430 nm is provided on one side of said transparent glass substrate, and a blue conditioning film having an average transmittance of 70 to 90% in a wavelength range of 430 to 450 nm and a transmittance of at least 90% in a wavelength range of 460 to 520 nm is provided on the other side of said transparent glass substrate.

\* \* \* \* \*